US011914937B2

(12) United States Patent
Chen et al.

(10) Patent No.: US 11,914,937 B2
(45) Date of Patent: Feb. 27, 2024

(54) COMPUTATIONAL FRAMEWORK FOR MODELING OF PHYSICAL PROCESS

(71) Applicants: Lawrence Livermore National Security, LLC, Livermore, CA (US); Virginia Polytechnic Institute and State University, Blacksburg, VA (US)

(72) Inventors: Xiao Chen, Tracy, CA (US); Can Huang, Livermore, CA (US); Liang Min, Pleasanton, CA (US); Charanraj Thimmisetty, Dublin, CA (US); Charles Tong, Danville, CA (US); Yijun Xu, Nanjing (CN); Lamine Mili, New Alexandria, VA (US)

(73) Assignees: LAWRENCE LIVERMORE NATIONAL SECURITY, LLC, CA (US); VIRGINIA TECH INTELLECTUAL PROPERTIES, INC., VA (US)

( * ) Notice: Subject to any disclaimer, the term of this patent is extended or adjusted under 35 U.S.C. 154(b) by 0 days.

(21) Appl. No.: 18/108,964

(22) Filed: Feb. 13, 2023

(65) Prior Publication Data

US 2023/0205955 A1    Jun. 29, 2023

Related U.S. Application Data

(62) Division of application No. 16/721,588, filed on Dec. 19, 2019, now Pat. No. 11,580,280.

(Continued)

(51) Int. Cl.
*G06F 30/27* (2020.01)
*G06N 20/00* (2019.01)
(Continued)

(52) U.S. Cl.
CPC ............ *G06F 30/27* (2020.01); *G06N 7/01* (2023.01); *G06N 20/00* (2019.01); *G06F 2111/10* (2020.01)

(58) Field of Classification Search
CPC ..... G06F 30/27; G06F 2111/10; G06N 20/00; G06N 7/01
See application file for complete search history.

(56) References Cited

PUBLICATIONS

Pegoraro PA, Angioni A, Pau M, Monti A, Muscas C, Ponci F, Sulis S. Bayesian approach for distribution system state estimation with non-Gaussian uncertainty models. IEEE Transactions on Instrumentation and Measurement. Aug. 11, 2017;66(11):2957-66. (Year: 2017).*

(Continued)

*Primary Examiner* — Chuen-Meei Gan
(74) *Attorney, Agent, or Firm* — Perkins Coie LLP

(57) ABSTRACT

Techniques, systems, and devices are described for providing a computational frame for estimating high-dimensional stochastic behaviors. In one exemplary aspect, a method for performing numerical estimation includes receiving a set of measurements of a stochastic behavior. The set of correlated measurements follows a non-standard probability distribution and is non-linearly correlated. Also, a non-linear relationship exists between a set of system variables that describes the stochastic behavior and a corresponding set of measurements. The method includes determining, based on the set of measurements, a numerical model of the stochastic behavior. The numerical model comprises a feature space comprising non-correlated features corresponding to the stochastic behavior. The non-correlated features have a dimensionality of M and the set of measurements has a dimensionality of N, M being smaller than N. The method includes generating a set of approximated system variables corresponding to the set of measurements based on the numerical model.

20 Claims, 10 Drawing Sheets

Related U.S. Application Data

(60) Provisional application No. 62/782,231, filed on Dec. 19, 2018.

(51) Int. Cl.
    *G06N 7/01*     (2023.01)
    *G06F 111/10*     (2020.01)

(56) References Cited

PUBLICATIONS

Xu Y, Mili L, Sandu A, von Spakovsky MR, Zhao J. Propagating uncertainty in power system dynamic simulations using polynomial chaos. IEEE Transactions on Power Systems. Aug. 15, 2018;34(1):338-48. (Year: 2018).*

Septier F, Peters GW. Langevin and Hamiltonian based sequential MCMC for efficient Bayesian filtering in high-dimensional spaces. IEEE Journal of selected topics in signal processing. Nov. 2, 2015;10(2):312-27. (Year: 2015).*

Scholz T. Stochastic methods for the characterization and simulation of wind energy production (Doctoral dissertation, Universidade de Lisboa (Portugal)). (Year: 2016).*

Pegoraro et al., "Bayesian approach for distribution system state estimation with non-Gaussian uncertainty models," IEEE Transactions on Instrumentation and Measurement. Aug. 11, 2017;66(11):2957-66. (Year: 2017).

Ren, Z., et al., "Probabilistic power flow analysis based on the stochastic response surface method," IEEE Transactions on Power Systems. Aug. 11, 2015 ;31 (3):2307-15. (Year: 2015).

Septier, F., et al., "Langevin and Hamiltonian based sequential MCMC for efficient Bayesian filtering in high-dimensional spaces," IEEE Journal of selected topics in signal processing. Nov. 2, 2015; 10(2):312-27. (Year: 2015).

Thimmisetty, et al., "High-dimensional Stochastic Inversion via Adjoint Models and Machine Learning," arXiv preprint arXiv: 1803.06295. Mar. 16, 2018. (Year: 2018).

Xu, et al., "Propagating uncertainty in power system dynamic simulations using polynomial chaos," IEEE Transactions on Power Systems. Aug. 15, 2018;34(1):338-48. (Year: 2018).

Xu, J., et al., "Response-surface-based Bayesian inference for power system dynamic parameter estimation," IEEE Transactions on Smart Grid. Jan. 11, 2019; 10(6):5899-909. (Year: 2019).

* cited by examiner

COMPUTATIONAL FRAMEWORK FOR MODELING OF PHYSICAL PROCESS

CROSS-REFERENCE TO RELATED APPLICATION(S)

This application is a divisional application of U.S. patent application Ser. No. 16/721,588, titled "COMPUTATIONAL FRAMEWORK FOR MODELING OF PHYSICAL PROCESS," filed on Dec. 19, 2019, which claims priority to and benefits of U.S. Provisional Application No. 62/782,231, titled "COMPUTATIONAL FRAMEWORK FOR DATA ASSIMILATION AND UNCERTAINTY MANAGEMENT OF LARGE-DIMENSIONAL DYNAMICS MODELS," filed on Dec. 19, 2018. The entire disclosure of the aforementioned applications is incorporated by reference as part of the disclosure of this application.

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Computational science and engineering have enabled researchers to model complex physical processes in many disciplines, climate projection, subsurface flow and reactive transport, seismic wave propagation, and power grid planning. However, inherent uncertainty in these complex physical processes makes the underlying problems essentially stochastic in nature. As a result, the current techniques for generating models result in models that are often not sufficiently accurate to take actions based on these models The accuracy of models depends in large part on the accuracy of the key parameters for the models. The consequences of inaccurate value for key parameters can lead to dire consequences. For example, in the area of power generation, accurate modeling of generator dynamic is of paramount importance to power system dynamic security analysis. Indeed, inaccurate parameter values may lead to inappropriate control actions, which in turn may result in power system failures. In 1996, a widespread blackout in the Western Electricity Coordinating Council (WECC) system was caused by severe model discrepancy. Because of adverse consequences of inaccurate models, the North American Electric Reliability Corporation (NERC) has issued reports that require the validation and the calibration of the models of large generators and their controllers in North America every five years, aiming to have the dynamic model responses match the recorded measurements reasonably well.

The traditional offline stage-testing based methods that are used to generated key parameter values have problems in that they are very costly, time-consuming, and labor intensive. To overcome these problems, online low-cost phasor-measurement-unit (PMU)-based methods have been developed. Some of these PMU-based methods estimate the generator moment of inertia, while others estimate other generator parameters using the Kalman filtering approach. Unfortunately, the former methods calculate only point estimated values of the inertia parameters without providing their confidence intervals, while the latter methods suffer from the weaknesses of Kalman filters such as the Gaussian assumption for the process and measurement noise and the slow convergence rate. Unlike the above methods, Bayesian-inference based methods provide maximum-a-posteriori (MAP) parameter estimated values along with the corresponding posterior probability distributions. Furthermore, they are not limited to Gaussian assumptions. However, the posterior distribution in the Bayesian inference is typically obtained by Markov Chain Monte Carlo (MCMC)-based methods, which require prohibitive computing times. To reduce computing times, some methods keep the approximated Gaussian assumption while taking the local optimization approach. Unfortunately, with these methods, the local optima may be highly biased when the initial guess is far from the true value or the posterior distribution is non-Gaussian.

Other approaches for improving the accuracy of key parameter values to improve model predictability is to apply uncertainty quantification requires solving an inverse problem by combining prior knowledge, simulations, and experimental observations. One example approach for performing the inversion is the "variational data assimilation" method, which is analogous to the deterministic nonlinear least square methods. However, this method by its deterministic nature cannot produce solutions with complete description of their probabilistic density functions (PDFs), which are critical for predicting the system performance. Unlike deterministic inversion, stochastic inversion aims to provide more complete description of the PDFs. Bayesian inference, in particular, provides a systematic framework for integrating prior knowledge of the stochastic sources and measurement uncertainties to compute detailed posteriors. However, Bayesian inference of high-dimensional and nonlinearly correlated stochastic source is computationally intractable. Moreover, unreasonable choices of source priors may have major effects on posterior inferences. Other conventional approaches are limited in their applications because they often assume Gaussian priors and posteriors, linearly correlated source fields, and/or no parametric and model form uncertainties in the simulation models. These deficiencies may result in unreliable solutions that may result in taking of inappropriate actions.

SUMMARY

Techniques, systems, and devices are disclosed for providing a computational frame for estimating high-dimensional stochastic behaviors. In particular, the disclosed techniques can be implemented in various embodiments to perform efficient and robust statistical estimation for high-dimensional and nonlinearly correlated sources and with non-standard probability distributions.

In one exemplary aspect, a method for performing numerical estimation is disclosed. The method includes receiving a set of measurements of a stochastic behavior. The set of correlated measurements follows a non-standard probability distribution and is non-linearly correlated. Also, a non-linear relationship exists between a set of system variables that describes the stochastic behavior and a corresponding set of measurements. The method includes determining, based on the set of measurements, a numerical model of the stochastic behavior. The numerical model comprises a feature space comprising non-correlated features corresponding to the stochastic behavior. The non-correlated features have a dimensionality of M and the set of measurements has a dimensionality of N, M being smaller than N. The method includes generating a set of approximated system variables corresponding to the set of measurements based on the numerical model.

In another exemplary aspect, a system for performing numerical estimation comprises a plurality of sensors configured to collect a set of measurements of a stochastic behavior. The set of correlated measurements follows a non-standard probability distribution and is non-linearly correlated. Also, a non-linear relationship exists between a set of system variables that describes the stochastic behavior and a corresponding set of measurements. The system includes a processor coupled to the plurality of sensors and a memory including processor executable code. The processor executable code upon execution by the processor configures the processor to determine, based on the set of measurements, a numerical model of the stochastic behavior. The numerical model comprises a feature space comprising non-correlated features corresponding to the stochastic behavior. The non-correlated features have a dimensionality of M and the set of measurements has a dimensionality of N, M being smaller than N. The processor is also configured to generate a set of approximated system variables according to the set of measurements based on the numerical model.

In yet another exemplary aspect, a non-transitory storage medium having code stored thereon is disclosed. The code, upon execution by a processor, causes the processor to implement a numerical estimation method that comprises determining, based on the set of measurements, a numerical model of the stochastic behavior. The numerical model comprises a feature space comprising non-correlated features corresponding to the stochastic behavior. The non-correlated features have a dimensionality of M and the set of measurements has a dimensionality of N, M being smaller than N. the method includes adjusting the feature space such that the non-correlated features follow a standard probability distribution, expanding the feature space having the dimensionality of M to the dimensionality of N, and sampling the expanded feature space based on a statistical inference approach to determine a set of approximated system variables corresponding to the set of measurements.

The above and other aspects and features of the disclosed technology are described in greater detail in the drawings, the description and the claims.

DETAILED DESCRIPTION

Techniques are provided to generate models of physical processes such as model for power generation. The techniques can be implemented in various embodiments to perform efficient stochastic inversion for problems with high-dimensional and nonlinearly correlated sources and with non-standard probability distributions. The techniques can also be used to manage uncertainties in simulation models and measurement data. More specifically, the techniques can perform (1) nonlinear dimension reduction of high-dimensional, non-standard, and/or nonlinearly correlated stochastic sources, (2) fast forward uncertainty propagation (e.g., through ensemble model simulations), (3) backward uncertainty propagation (e.g., via fast adjoint-based Bayesian inversion algorithms), and (4) high-dimensional source recovery via nonlinear optimization.

The relationship between measurements z and state variables x of many of the systems to be modeled can be formulated as:

$$z = h(x) + e \qquad \text{Eq. (1)}$$

where z is the M-dimensional vector of measurements, x is the N-dimensional vector of state variables, h is the non-linear function that relates x and z, and e is the vector of measurement errors. Given a limited number of measurements and non-linearities in the measurement model h, solving the inverse problem is mathematically ill-posed. Furthermore, measurements errors typically follow non-Gaussian distributions as opposed to Gaussian distributions as assumed by many conventional techniques, thereby leading to non-Gaussian posterior states.

Using Bayesian inference, a framework for integrating prior knowledge and measurement uncertainties can be defined as:

$$\pi_{post}(x) := \pi(x|z) \propto \pi_{prior}(x) \pi_{lik}(z|x) \qquad \text{Eq. (2)}$$

where $\pi_{prior}(x)$ is a prior state model based on expert knowledge, $\pi_{lik}(x)$ is the likelihood function, a conditional probability of the measurements given the states x, and $\pi_{post}(x)$ is posterior state model.

Figure 1:
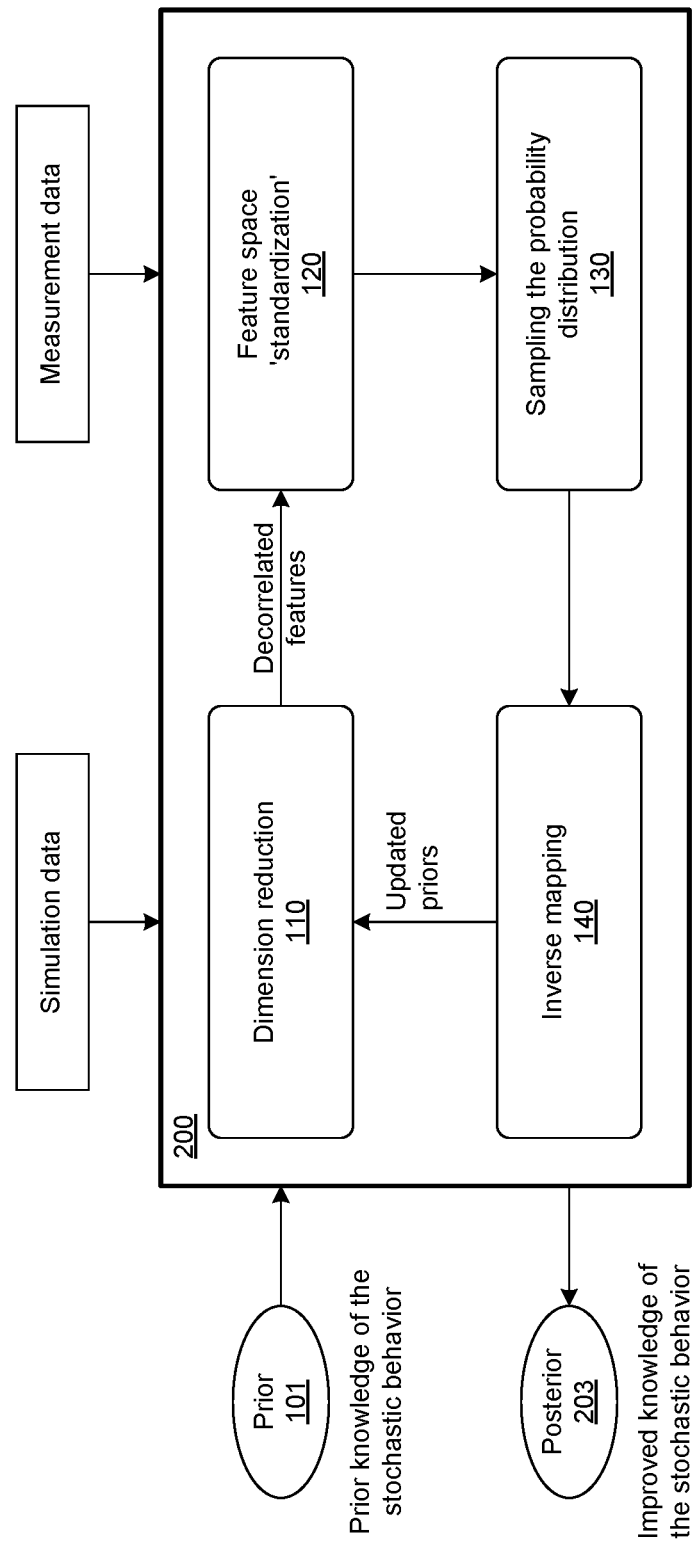
FIG. 1 illustrates a schematic diagram of a system that performs efficient and robust high-dimensional statistical inversion in accordance with the present disclosure.

FIG. 1 illustrates a schematic diagram of a system that performs efficient and robust high-dimensional statistical inversion in accordance with the present disclosure. The system starts with prior knowledge 101 of a stochastic behavior (e.g., $\pi_{prior}(x)$). The prior knowledge 101 can be one or more probability distribution functions (PDFs) that have been derived based on past measurements or simulation data. The system also receives additional inputs in the form of simulation data or measurements, e.g., from a simulation system or a plurality of sensors. For example, sensor measurements from power grids can provide information regarding the distribution behavior of the power system. Similarly, sensor measurements of surface deformations can provide information regarding subsurface structures. However, due to the nature of such physical behaviors, the input data can be high dimensional data that is non-linearly correlated, which leads to intractability of the stochastic inversion problem. To address such issues, the system 100 performs a dimensionality reduction at operation 110 to obtain a set of decorrelated features having a lower dimensionality. For example, techniques such as the kernel principal component analysis or manifold-learning based Isomap, can be applied to reduce the dimensionality of the input data to create a "surrogate model" for subsequent sampling. In some embodiments, data of the surrogate model may not follow any standardize probability distribution. That is, the data may not be distributed in a way to allow efficient analytical or numerical sampling. In those cases, the system 100 performs, at operation 120, a feature space "standardization" operation to produce output that follows a standard probability distribution. In some embodiments, the standard probability distribution is a Gaussian distribution. Although many techniques described herein use the Gaussian distribution, the techniques are similarly applicable to other standardized probability distributions, such as the beta distribution. At operation 130, the system 100 samples the probability distribution obtained after operation 120 using a statistical inference approach, such as Markov chain Monte Carlo (MCMC) methods or stochastic economic dispatch (SED) methods. Various techniques, such as variations of the MCMC methods, can be applied to improve the efficiency of the mapping and address impact to the model from rare events (e.g., failure events that are highly unlikely to occur) The system 100 then performs, at operation 140, inverse mapping to obtain posterior PDF(s) 203 that represent improved knowledge of the stochastic behavior ($\pi_{post}(x)$).

Figure 2:
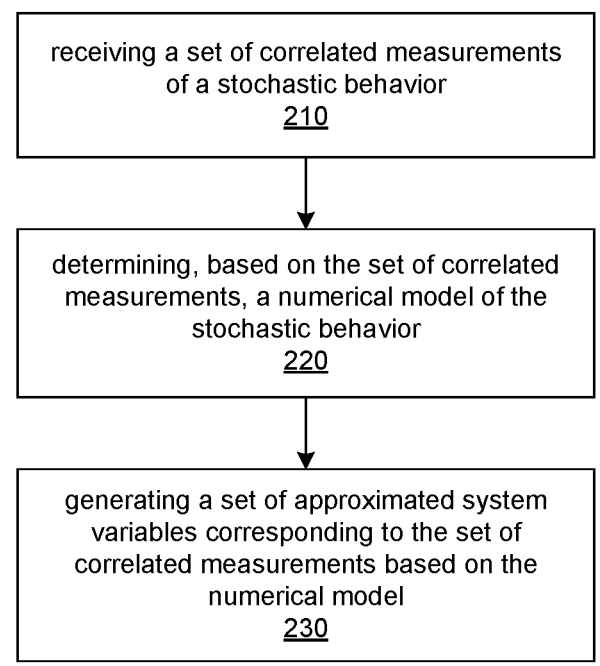
FIG. 2 is a flowchart representation of a method for performing numerical estimation in accordance with the present disclosure.

FIG. 2 is a flowchart representation of a method 200 for performing numerical estimation in accordance with the present disclosure. The method 200 includes, at operation 210, receiving a set of measurements of a stochastic behavior. The set of measurements follows a non-standard probability distribution and is non-linearly correlated. Also, a non-linear relationship exists between a set of system variables that describes the stochastic behavior and a corresponding set of measurements. The method 200 includes, at operation 220, determining, based on the set of measurements, a numerical model of the stochastic behavior. The numerical model comprises a feature space comprising non-correlated features corresponding to the stochastic behavior. The non-correlated features have a dimensionality of M and the set of measurements has a dimensionality of N, M being smaller than N. The method 200 also comprises, at operation 230, generating a set of approximated system variables corresponding to the set of measurements based on the numerical model. In some embodiments, the non-correlated features are mapped to a standard probability distribution prior to the generation of the set of approximated system variables.

In some embodiments, the feature space is determined based on a statistical transformation that converts a first set of correlated values into a second set of uncorrelated values having a lower dimensionality. In some embodiments, the statistical transformation may employ a kernel principal component analysis, a Karhunen-Loeve expansion, or a manifold-learning based Isomap construction.

In some embodiments, the non-correlated features in the feature space follow a non-standard probability distribution. The techniques may, prior to generating the set of approximated system variables, map the feature space to a set of variables representing the numerical model. The set of variables follows a standard probability distribution.

In some embodiments, the techniques determine set of variables that follows the standard probability distribution based on a response surface approach that may employ a polynomial chaos expansion.

In some embodiments, the techniques generate the set of approximated system variables by sampling the numerical model based on a statistical inference approach. The statistical inference approach may be a Metropolis-Hasting Markov Chain Monte Carlo (MCMC) approach and a Langevin MCMC approach. The system inference approach may alternatively be a combination of a Langevin MCMC approach and an adaptive MCMC that calibrates a covariance of a distribution function based on a history of a Markov Chain.

In some embodiments, the techniques determine a second numerical model of the stochastic behavior. The second numerical model has a space of the same dimensionality of N. The stochastic behavior is associated with one or more target domains. The set of approximated system variables is generated by sampling the numerical model using a first statistical inference approach and reevaluating a subset of samples in the one or more target domains based on the second numerical using a second statistical inference approach. The one or more target domains may correspond to one or more failure events with corresponding probabilities of occurrences.

In some embodiments, the techniques determine a set of weighted measurements based on evaluating weights for the set of measurements. The techniques determine the numerical model of the stochastic behavior based on the set of weighted measurements. The weights may be evaluated iteratively for the set of measurements.

In some embodiments, the techniques generate the set of approximated system variables by expanding the non-correlated features having the dimensionality of M to the set of approximated system variables having the dimensionality of N. The standard probably distribution may be at least a Gaussian distribution or a Beta distribution. The techniques may update the numerical model based on the set of approximated system variables for a subsequent estimation.

In some embodiments, the stochastic behavior is the behavior of a power distribution system that includes a renewable energy system.

Details of the disclosed techniques are further described in the following example embodiments. It is noted that section headings are used in the present document only to improve readability and do not limit scope of the disclosed embodiments and techniques in each section to only that section.

Example Embodiments Based on Markov Chain Monte Carlo (MCMC)

Figure 3:
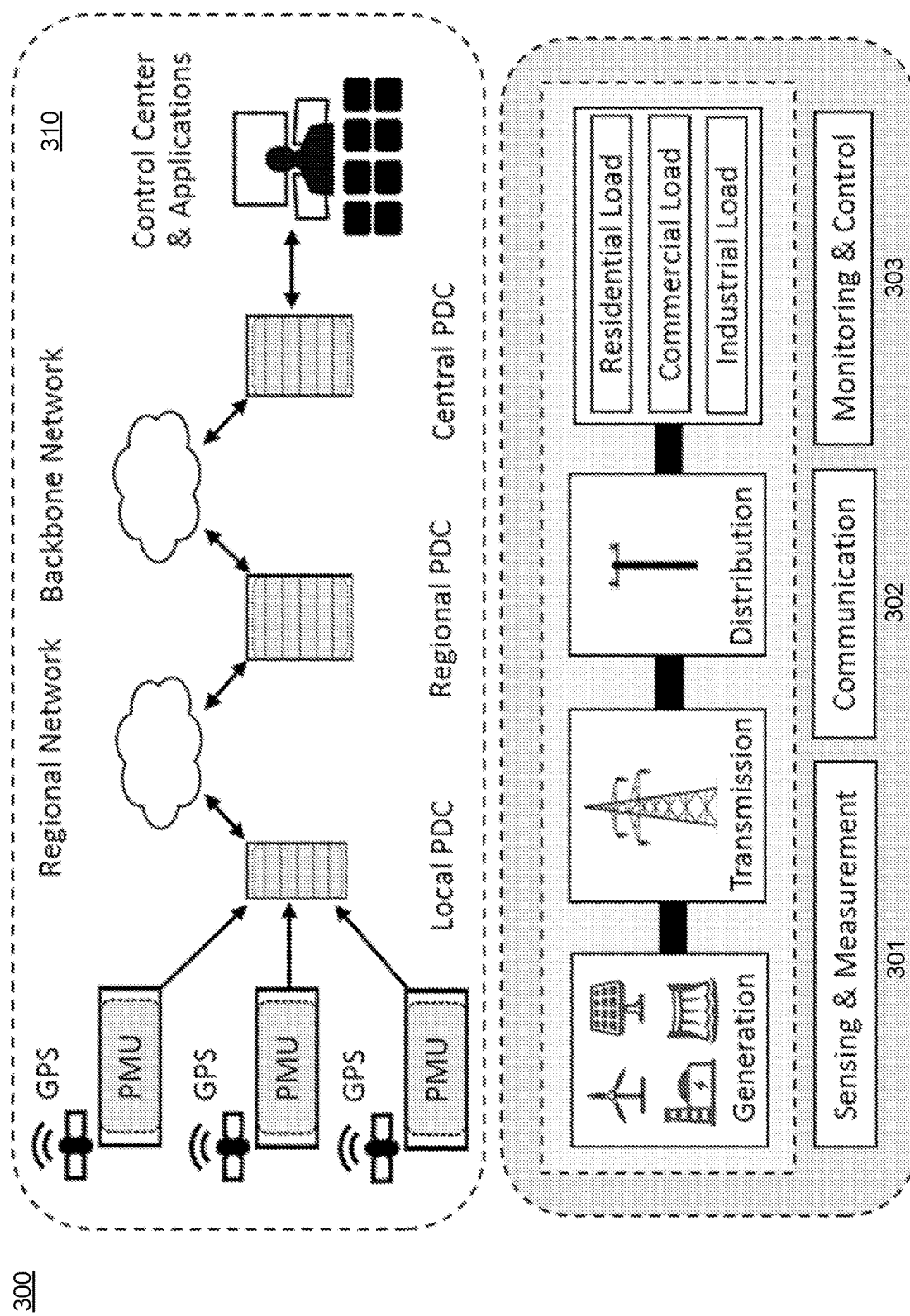
FIG. 3 illustrates an example power grid system.

An electric power grid is an interconnected network for delivering electricity from generators to loads by transmission and distribution systems. FIG. 3 illustrates an example power grid system 300. The power grid system a network overlaid with sensing and measurement components 301, communication components 302, and monitoring and control components 303 that maintain grid reliability, security, and efficiency. Today's grid is evolving into the smart grid to provide more reliable, more efficient, and more sustainable electricity to customers. To achieve those attributes, a variety of smart grid technologies are demanded.

In sensor and measurement fields, the synchrophasor is one of the most important smart grid technologies. A synchrophasor system 310, such as shown in FIG. 3, includes phasor measurement units (PMUs), phasor data concentrators (PDCs), and communication networks. The PMUs are used to produce synchrophasor measurements from current and voltage signals (e.g., the ones from current and voltage transducers) and a standard time signal (e.g., the one from a global positioning system (GPS)). Then the PDCs are used to transfer synchrophasor data from PMUs/PDCs to a control center and/or various applications.

Figure 4:
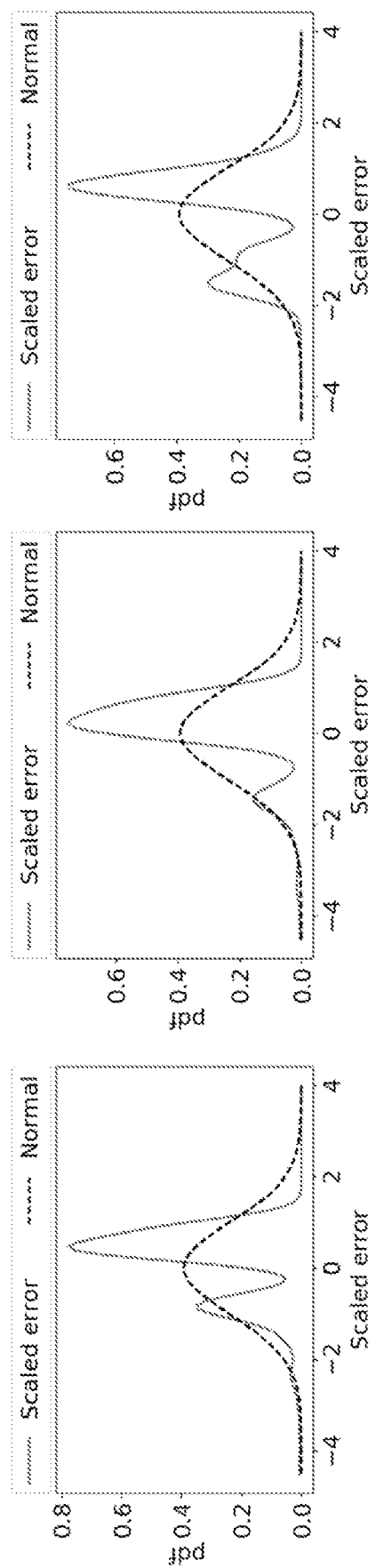
FIG. 4 illustrates example probability distributions of voltage magnitude error differences with standard Gaussian for time windows of 1 s, 5 s, and 10 s in a power grid.

In practice, the synchrophasor inevitably involves measurement errors, which may affect or even disable certain synchrophasor applications. It is a demanding task to analyze and model the synchrophasor measurement error. Traditionally, the synchrophasor is designed for transmission systems and the synchrophasor measurement error is assumed as a Gaussian noise in most synchrophasor applications. However, real PMU measurement errors do not follow a Gaussian distribution. FIG. 4 illustrates example probability distributions of voltage magnitude error differences with standard Gaussian for time windows of 1 s, 5 s, and 10 s in a power grid. As shown in FIG. 4, the use of the non-Gaussian model, such as Gaussian mixture (GM) model, for representing the measurement error, can more accurate and realistic than the traditional Gaussian model.

Furthermore, compared to transmission systems, distribution systems are invested with fewer sensors and measurements, and distribution networks are often plagued by large measurement uncertainties due to their highly distributed and diverse infrastructure. The current distribution system algorithms mainly derive from the transmission systems and inherit the Gaussian/linearity assumptions. However, these assumptions are violated especially in the uncertain and diverse distribution network. Furthermore, the existing techniques view the power grid as an over determined system, which ignore the measurement possibilities and model uncertainties and only work out a group of deterministic estimates. From a statistical point of view, the deterministic state estimates ignore some valuable information for the distribution systems with dynamic and diverse nature. The disclosed techniques can be used to implement an advanced state estimation system that can overcome such limitations.

Referring back to the Bayesian inference framework in Eq. (2), the measurement error can be assumed to be a Gaussian mixture (GM) model having a PDF as weighted sum of the Gaussians:

$$p(e|\gamma) = \Sigma_{i=1}^{N_c} \omega_i p(e|\mu_i, \Sigma i) \quad \text{Eq. (3)}$$

where $N_c$ is the number of Gaussian mixtures and $\omega_i$ is a positive quantity with $\Sigma \omega_i = 1$, and $\gamma$ is the set of parameters such as mean $\mu_i$, covariance $\Sigma i$, and $\omega_i$ that describe each component of the GM. $p(e|\mu_i, \Sigma i)$ is M-dimensional Gaussian density function of each mixture component given by:

$$p\left(e|\mu_i, \sum i\right) = \frac{e^{-\frac{1}{2}(e-\mu_i)^T \Sigma_i^{-1}(e-\mu_i)}}{(2\pi)^{M/2} \det\left(\sum i\right)^{1/2}} \quad \text{Eq. (4)}$$

The set of parameters of the GM, $\gamma$, is computed from the measurements via expectation-maximization (EM) algorithm. Given the nonlinear mapping between the states and measurements and GM model for the error, the posterior states follow non-standard distributions and Markov chain Monte Carlo (MCMC) methods can be relevant techniques for posterior sampling.

Dimensionality Reduction

MCMC methods comprise a class of statistical inference algorithms for sampling from a probability distribution. By constructing a Markov chain that has the desired distribution as its equilibrium distribution, one can obtain a sample of the desired distribution by recording states from the chain. Through recent developments, such as delayed rejection, adaptive Metropolis, etc., the MCMC methods have become sophisticated and computationally expensive, especially for problems that have a high-dimensional parameter space. However, with the increasing sophistication, the MCMC methods can also be computationally intensive given the expensive measurement model and high-dimensionality of the states. One way to reduce the computational complexity is to construct a low-fidelity model. The disclosed techniques can be used to construct a surrogate model (that is, a model having a low dimensionality or low fidelity) of the stochastic behavior by reducing the dimensionality of the states and mapping corresponding feature variables to Gaussian random variables to enable efficient subsequent processing.

Figure 5:
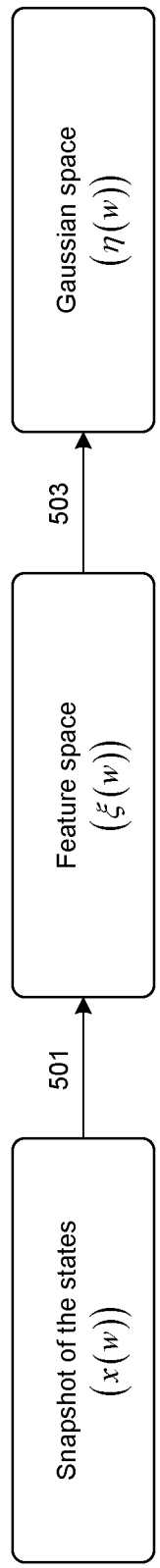
FIG. 5 illustrates an example flowchart of mapping input states to a Gaussian space in accordance with the present disclosure.

As discussed above, the high dimensionality of the discretized parameter space can lead to intractability of the stochastic inversion problem. To efficiently solve the inverse problems that involve high-dimensional input data that does not follow any standardized distribution, a mapping from the original states x to a standardized distribution space (e.g., Gaussian space) with lower dimensionality is needed. FIG. 5 illustrates a flowchart of a mapping the input states (e.g., measurements) to a Gaussian space. The high-dimensional discretized parameter space $x(\omega)$ is first mapped to a low-dimensional features space $\xi(\omega)$ at operation 501 (also shown as operation 110 in FIG. 1).

In some embodiments, the mapping can be performed using a kernel principal component analysis (KPCA) method. Let $Y(x,\omega) := \ln(\mu(x,\omega))$ be a random field. The covariance function can be defined as $C_Y(x,y) = <\tilde{Y}(x,\omega)\tilde{Y}(y,\omega)>_\omega$, where $\tilde{Y}(x,\omega) := Y(x,\omega) - <Y(x,\omega)>_w$ and $<.>_\omega$ is an expectation factor. Assume $C_Y$ is bounded, symmetric and positive definite, it can be represented as $$C_Y(x,y) = \Sigma_{i=1}^{\infty} \gamma_i e_i(x) e_i(y) \quad \text{Eq. (5)}$$

where $\gamma_1 > \gamma_2 \geq \ldots > 0$ are eigenvalues, and $e_i(x)$ and $e_i(y)$ are deterministic and mutually orthogonal functions. The random process $\tilde{Y}(x,\omega)$ an be expressed in terms of $e_i(x)$ as:

$$\tilde{Y}(x,\omega) = \Sigma_{i=1}^{\infty} \xi_i(\omega) \sqrt{\gamma_i} e_i(x) \quad \text{Eq. (6)}$$

where $\{\xi_i(\omega)\}$ are zero-mean and uncorrelated variables. Given $C_Y$, $$\Sigma_{i=i}^{M} \omega_i C_Y(x_i, y) e(x_i) = \gamma_e(y) \quad \text{Eq. (7)}$$

where M is the number of sample points. Assuming there are enough samples points and equal weights $$\omega_i = \frac{1}{M}, \quad \text{Eq. (7)}$$

can be solved by simple eigen-decomposition of $C_Y(x_i,y)$, for which principal component analysis (PCA) can be used to reduce the dimension. In general, PCA can only obtain efficient embeddings for linearly correlated data points, the KPCA method can deal with complex models that have nonlinearly correlated data. The nonlinear mapping can be seen as a kernel map, thus allowing the handling of the high dimensionality by using a technique called "kernel trick." A kernel trick introduces a virtual mapping that results in smaller dimensional equivalent system. The kernel trick allows the KPCA to be performed in the high dimensional feature space, with similar computational expense as PCA. An eigen-decomposition can be performed on a relatively small space, which is independent of the selection of the nonlinear mapping and the feature space.

Response Surface Based Sampling

Referring back to FIG. 5, the feature variables from KPCA are non-Gaussian, uncorrelated and dependent random variables. The low-dimensional uncorrelated features space $\xi(\omega)$ can further be mapped to a space that follows a standardized distribution (e.g., Gaussian) at operation 503 (also shown as operation 120 in FIG. 1).

In general, $\xi^d$ the discrete observations of are non-Gaussian, uncorrelated and dependent random variables, which may complicate the Bayesian inversion procedures (e.g., by requiring more frequent sampling from their distributions). Determination of a unique map from the dependent $\xi^d$ to a standard independent random variable space $\eta$ can be achieved in various ways. In some embodiments, a response surface-based method, such as a polynomial chaos expansion (PCE), can be constructed to perform the mapping. Each component of $\{\xi_l^d\}_{l=1}^M$ can be obtained using PCE as $$\xi_l^d = \Sigma_{n=0}^\infty c_{n,l} \Psi_n(\eta_l(\omega)), l=1,2,\ldots \quad \text{Eq. (8)}$$

where $\eta_l$ are the independent standard Gaussian random variables. $\Psi_n(\eta_l(\omega))$ are Hermite polynomials, and $c_{n,l}$ are real valued deterministic coefficients. The coefficients in the equation above can be computed using Bayesian inference or using a non-intrusive projection method to find a continuous parameterized representation based on the discrete $\xi^d$. Let $\{\eta_l\}$ be a standard Gaussian random variable, then by matching the cumulative density function (CDF) of $\xi_l^d$ and $\eta_l$, each component of $\xi_l$ can be expressed in terms of random variables $\eta_l$ by following non-linear mapping:

$$\xi_l^d = F_{\xi_l^d}^{-1} \circ F_{\eta_l}(\eta_l) \quad \text{Eq. (9)}$$

where $F_{\xi_l^d}$ and $F_{\eta_l}$ denote the cdfs of $\xi_l^d$ and $\eta_l$ respectively. The coefficients of the PCE can be computed using a numerical integration based on empirical CDF $F_{\xi_l^d}$.

With the mapping of the original states $x(\omega)$ to the Gaussian space $\eta(\omega)$, the Bayesian inversion can be performed in the $\eta$ space and the corresponding posterior can be obtained by:

$$\pi_{postiror}(\eta) := \pi(\eta|z) \propto \pi_{prior}(\eta) \pi_{lik}(z|\eta) \quad \text{Eq. (10)}$$

Unlike deterministic inversions, Eq. (10) provides a probabilistic characterization of the solution to the stochastic inverse problem. In this context, the likelihood function $\pi_{lik}(z|\eta)$ is a conditional probability of the model outputs with given model parameters $\eta$. Also, the prior probability density function $\pi_{prior}(\eta)$ allows the framework to inject prior knowledge to the model.

The prior density function prior can be expressed as a multivariate Gaussian in a form of:

$$\pi_{prior}(\eta) \propto \exp\left(-\frac{1}{2}\|\eta-\bar{\eta}\|_{\Gamma_{prior}^{-1}}^2\right) \quad \text{Eq. (11)}$$

The simplification is due to the independence of the $\eta$ vector. Specifically, the covariance matrix $\Gamma_{prior}$ is an identify matrix and $\bar{\eta}$ is a zero vector. The representation of likelihood function is important to the characterization of the posterior density function $\pi_{postiror}$.

In some embodiments, the likelihood function can be expressed as:

$$\pi_{likelihood}(u_{obs}|\eta) \propto \exp\left(-\frac{1}{2}\|f(\eta)-u_{obs}\|_{\Gamma_{prior}^{-1}}^2\right) \quad \text{Eq. (12)}$$

$$-\log(\pi(u_{obs}|\eta)) = \left(-\frac{1}{2}\|f(\eta)-u_{obs}\|_{\Gamma_{prior}^{-1}}^2\right) \quad \text{Eq. (13)}$$

The corresponding posterior density can be derived as $$\pi_{prior}(\eta) \propto \exp(J(\eta)) \quad \text{Eq. (14)}$$

where $J(\eta)$ is given by:

$$J(\eta) := \frac{1}{2}\|f(\eta)-u_{obs}\|_{\Gamma_{prior}^{-1}}^2 + \frac{1}{2}\|\eta-\bar{\eta}\|_{\Gamma_{prior}^{-1}}^2 \quad \text{Eq. (15)}$$

where $$J_1(\eta) = \frac{1}{2}\|f(\eta)-u_{obs}\|_{\Gamma_{prior}^{-1}}^2 \text{ and } J_2(\eta) = \frac{1}{2}\|\eta-\bar{\eta}\|_{\Gamma_{prior}^{-1}}^2.$$

It is nontrivial to obtain the functional derivative of $J(\eta)$. In some embodiments, an adjoint model and automatic differentiation to compute the gradients. The relationship between the variables $\eta, \xi, y, \mu, \lambda, u$ can be summarized as:

$$\eta \xrightarrow{PCE} \xi \xrightarrow{Pre-image} y \xrightarrow{exp} \mu, \lambda \xrightarrow{forward\,model} u$$

where the pre-imaging problem is solved to project snapshots from the feature space back to original space. One method to perform pre-imaging involves solving an optimization problem:

$$\min_y \rho(y) = \|\Phi(y)-Y\|^2 \quad \text{Eq. (16)}$$

where y and Y are points in the feature space and the original space respectively, and $\|\cdot\|$ is the Euclidean norm. The above minimization problem can be solved as an iterative fixed-point problem.

The objective function J can be expressed in terms of $\eta$ by:

$$\eta \to \frac{1}{2}\left(f(\eta)-u_{obs}, \Gamma_{noise}^{-1}(f(\eta)-u_{obs})\right) + \frac{1}{2}\left(\eta-\bar{\eta}, \Gamma_{prior}^{-1}(\eta-\bar{\eta})\right) \quad \text{Eq. (17)}$$

The expression for the gradient of $J_2(\eta)$ can be obtained as:

$$\nabla_\eta J_2(\eta) = \Gamma_{prior}^{-1}(\eta-\bar{\eta})$$

The gradient information of $J_1(\eta)$ can be expressed as $$\nabla_\eta J_1(\eta) = (\nabla_\eta \xi)^T (\nabla_\xi y)^T (\nabla_y \lambda)^T (\nabla_{\lambda,\pi} u)^T \Gamma_{noise}^{-1}(f(\eta)-u_{obs}) \quad \text{Eq. (18)}$$

The linear operator $\nabla_{\lambda,\pi} u$ represents the tangent linear model of the forward problem and its adjoint operator is $(\nabla_{\lambda,\pi} u)^T$. The linear operation $(\nabla_\eta \xi)^T$ represents the adjoint model of the PCE, and $(\nabla_\xi y)^T$ represents the adjoint model of the pre-image iteration mapping.

Due to the non-linear relation between the parameters $\eta$ and the measurements, direct sampling from the posterior is not possible. MCMC methods provide a systematic way to sample from the corresponding posteriors (also shown as operation 130 in FIG. 1). However, MCMC methods require many simulations of the forward models, leading to computational intractability when the forward models are expensive to evaluate. To reduce the computational complexity, in some embodiments, a Metropolis-Hasting MCMC (MHMCMC) is adopted to sample from the posterior that scales linearly with the dimension of the state space. The MHMCMC algorithm accepts or rejects a sample from the proposal using α, where q is the proposal distribution.

$$\alpha = \min\left\{1, \frac{\pi_{post}(\eta_{k+1})q(\eta_k|\eta_{k+1})}{\pi_{post}(\eta_k)q(\eta_{k+1}|\eta_k)}\right\}$$ Eq. (19)

To accelerate the MCMC method, the forward solver can be replaced with a PCE-based response surface. The generalized polynomial chaos expansion has been shown to be a cost-effective tool in modeling response surfaces. The stochastic outputs are represented as a weighted sum of a given set of orthogonal polynomial chaos basis functions constructed from the probability distribution of the input random variables. Let be a vector of random variables following a standard probability distribution (e.g., the Gaussian or the beta distribution). A unique orthogonal polynomial is associated with ξ. Let Φ denote the corresponding polynomial chaos basis and let a denote the ith polynomial chaos coefficient, we have:

$$z = \sum_{i=0}^{N_p} a_i \Phi_i(\xi)$$ Eq. (20)

where $N_p = (N+P)!/(N!P!) - 1$, N is the total number of the random variables, and P is the maximum order of the polynomial chaos basis function. From the polynomial chaos coefficients, the mean μ and the various $\sigma^2$ of the output z can be determined as follows:

$$\mu = a_0, \sigma^2 = \sum_{i=1}^{N_p} a_i^2 E[\Phi_i^2]$$ Eq. (21)

where E[.] is the expectation operation.

A set of one-dimensional polynomial chaos basis functions with respect to some real positive measure satisfy $$\int \varphi_r(\xi)\varphi_r(\xi)d\lambda \begin{cases} = 0 \text{ if } r \neq s \\ > 0 \text{ if } r = s \end{cases},$$

where λ is a probability measure defined as cumulative distribution function (CDF) of ξ. For every CDF, the associated orthogonal polynomials are unique. Similarly, any set of multi-dimensional polynomial chaos basis functions is orthogonal to each other with respect to their joint probability measure.

A set of multi-dimensional polynomial chaos basis functions can be constructed as the tensor product of the one-dimensional polynomial chaos basis associated with each input random variable.

$$\Phi(\xi) = \Phi(\xi_1) \otimes \Phi(\xi_2) \ldots \otimes \Phi(\xi_N)$$ Eq. (22)

where $\Phi(\xi_i)$ denotes the one-dimensional polynomial chaos basis for the ith random variable.

Collocation points can be regarded as a finite sample of $\xi = [\xi_1, \xi_2, \ldots, \xi_N]$ that are chosen to approximate the polynomial chaos coefficients. The elements of the collocation points are generated by using the union of the zeros and the roots of one higher-order, one-dimensional polynomial for every random variable.

In the Bayesian inference, the parameters x are viewed as random variables and hence are given prior PDFs. By mapping the parameters x into a PCE as the response surface of the dynamic power system model can be constructed as follows (also shown as operation 140 in FIG. 1):

1. Map the ith random parameter $x_i$ to a given random variable $\xi_i$ as $P_i = F_i^{-1}(T(\xi_i))$, wherein $F_i^{-1}$ is the inverse cumulative probability distribution function of $x_i$ and T is the cumulative probability distribution function of $\xi_i$.
2. Construct the polynomial chaos basis, then express the output z in the expansion form.
3. Construction M combinations of collocation points and put them into the polynomial chaos basis (M×($N_p$+1)) matrix $H_{pc}$.

$$H_{pc} = \begin{pmatrix} \Phi_0(\xi_1) & \ldots & \Phi_{NP}(\xi_1) \\ \vdots & \ddots & \vdots \\ \Phi_0(\xi_M) & \ldots & \Phi_{NP}(\xi_M) \end{pmatrix}$$ Eq. (23)

4. Compute the power system dynamic model output for the selected collocation points to get the (M×1) output Z matrix given by $$Z = (z(t,\xi_1)z(t,\xi_2) \ldots z(t,\xi_M))^T$$ Eq. (24)

5. Estimate the unknown coefficients A based on the collocation points that are selected and the model output from $Z = H_{pc}A$. A is the ($N_p$×1) coefficient vector expressed as:

$$A = (a_0(t)a_1(t) \ldots a_{Np}(t))^T$$ Eq. (25)

6. Let Â denote the estimated coefficient vector and let us define a residual vector r as $r = Z - H_{pc}\hat{A}$. Â can be estimated by minimizing the 2-norm of the residual vector $$\hat{A} = \underset{\hat{A}}{\mathrm{argmin}} r^T r$$

which yields $\hat{A} = (H_{pc}^T H_{pc})^{-1} H_{pc}^T Z$.

With the coefficients estimated and the bases selected, the PCE can be built for the target output. The system response surface can now be represented as polynomial form.

Tests have been conducted applying the disclosed techniques to power systems under the disturbances caused by one or more faults. Results have demonstrated that the techniques described herein can provide accurate estimation results under a three-phase fault, but with a much smaller computing time compared with conventional techniques. An example algorithm of a response-surface-based Bayesian Inference using the MHMCMC framework is illustrated by the following pseudo code.

| Algorithm The Response-surface-based Bayesian Inference using the M – H Algorithm |
|---|
| 1: Choose the initial guess of the parameters $m_0$ from the manufactured data as the Bayesian prior $m_{prior}$; |
| 2: Build the PCE surrogates as the response surface of the decentralized dynamic model; |
| 3: Compute $\log(\pi_{post}(m_0|d))$ from the PCE surrogate |
| 4: for k = 0,...,$N_{samples}$ − 1 do |
| 5: Generate new sample $m_{k+1}$ from $q(m_k,\bullet)$; |
| 6: Compute $\log(\pi_{post}(m_0|d))$ from the PCE surrogate |
| 7: Calculate the correction factor $c = \frac{q(m_{k+1}, m_k)}{q(m_k, m_{k+1})}$; |
| 8: Compute $\alpha(m_k, m_{k+1})$ defined as $\alpha(m_k, m_{k+1}) = \log\left(\min\left\{1, \frac{\pi_{post}(m_{k+1} \mid d)}{\pi_{post}(m_k \mid d)} \cdot c\right\}\right)$; |

| Algorithm The Response-surface-based Bayesian Inference using the M − H Algorithm |
| --- |
| 9:     Draw u ~ U([0,1)); |
| 10:    if log(u) < α($m_k$, $m_{k+1}$) then |
| 11:      Accept: Set $m_{k+1}$ = $m_{k+1}$; |
| 12:    else |
| 13:      Reject: Set $m_{k+1}$ = $m_k$; |
| 14:    end if |
| 15:  end for |
| 16:  Plot the PDF, $\pi_{post}$(m|d), and find the MAP points. |

Example Embodiments Based on Langevin Markov Chain Monte Carlo (LMCMC)

In some embodiments, a gradient-based Langevin Markov Chain Monte Carlo (LMCMC) can be adopted (e.g., in operation 130 shown in FIG. 1) to use gradient information computed in the feature space based on the adjoint PDE and automatic differentiation in the feature space. Unlike the MHMCMC algorithm that simply uses the proposed distribution function driven by random variables to approach the posterior distribution asymptotically, the LMCMC algorithm employs a combination of two mechanisms to generate the samples of a random walk. It first generates new samples via the Langevin dynamics mechanism, which uses the evaluations of the gradient of the target probability density function, then it accepts or rejects new samples using the MH mechanism. This Langevin dynamics enables the LMCMC a better convergence rate than the MH algorithm.

LMCMC considers the following overdamped Langevin-Ito diffusion process:

$$dX = \nabla \log \pi_{posterior}(X)dt + \sqrt{2}dW \quad \text{Eq. (26)}$$

The probability distribution of ρ(t) of x(t) approaches a stationary distribution, which is invariant under diffusion, and ρ(t) approaches the true posterior ($\rho_\infty = \pi_{posterior}$) asymptotically. Approximate sample paths of the Langevin diffusion can be generated by many discrete-time methods. Using a fixed time step t>0, the above equation can be written as:

$$X_{k+1} = X_k + t\nabla \log \pi(X_k) + \sqrt{2t}\xi_k \quad \text{Eq. (27)}$$

Here, each $\xi_k$ is an independent draw from a multivariate normal distribution with mean 0 and identity covariance matrix. This proposal is accepted or rejected similar to the Metropolis-Hasting algorithm using α:

$$\alpha = \min\left\{1, \frac{\pi(X_{k+1})q(X_k \mid X_{k+1})}{\pi(X_k)q(X_{k+1} \mid X_k)}\right\} \quad \text{Eq. (28)}$$

where $q(x' \mid x) \propto \exp\left(-\frac{1}{4t}\|x' - x't\nabla\log\pi(x)\|_2^2\right)$.

An example posterior sampling algorithm using the LMCMC framework is illustrated by the following pseudo code:

| Algorithm Posterior sampling using Langevin MCMC framework |
| --- |
| Choose initial parameters no |
| Compute $\pi_{posterior}(\eta_0)$ using Algorithm 1 |
| for l = 1 to N do |
|   Draw sample y from the proposal density function |
|   Compute $\pi_{posterior}(y)$ using algorithm 1 |
|   Compute $\alpha(\eta_l, y) = \min\left\{1, \frac{\pi_{posterior}(y)q(y \mid \eta_l)}{\pi_{posterior}(\eta_l)q(\eta_l \mid y)}\right\}$, where |
|   q(y\|$\eta_l$) andare computed |
|   Draw u ~ U([0,1]) |
|   if u < α{, y) then |
|     Accept: Set $\eta_{l+1}$ = y |
|   else |
|     Reject: Set $\eta_{l+1}$ = $\eta_k$ |
|   end if |
| end for |

Introducing the LMCMC under the PCE framework, the original complicated dynamic solver cab be simplified into the polynomial forms at ξ space. This can greatly simplify the derivation of the gradients of the posterior likelihood. Eq. (20) can be re-organized as:

$$z_i' = z_i^t + \left(\sum_{i=1}^N a_i^t \xi_i + \sum_{i=1}^N a_i^t \frac{\xi_i^2 - 1}{\sqrt{2}}\right) + \sum_{j=1}^N \sum_{1 \le i < j} a_i^t \xi_i \xi_j \quad \text{Eq. (29)}$$

Because of the fast convergence rate of the LMCMC, tests have shown that the PCE-based LMCMC can converge using 5×10⁴ samples with a solution time of 15 seconds. The disclosed techniques herein can achieve a three-orders-of-magnitude speedup factor compared to the traditional Bayesian inference methods. An example algorithm of a polynomial-chaos-expansion-based Bayesian Inference using the LMCMC framework is illustrated by the following pseudo code:

| Algorithm Polynomial-Chaos-Expansion-based Bayesian Inference using the Langevin MCMC |
| --- |
| 1:  Choose the initial guess of the parameters $m_0$ from the manufactured data as the Bayesian prior $m_{prior}$; |
| 2:  Mapping m into ξ via (11), build the PCE surrogates as the response surface of the decentralized dynamic model; |
| 3:  Compute $\log(\pi_{post}(\xi_0\mid d))$ from the PCE surrogate via (16); |
| 4:  for k=0,...,$N_{samples}$ − 1 do |
| 5:    Compute $\nabla\log(\pi_{post}(\xi_{k+1}\mid d))$ |
| 6:    Generate a new sample $\xi_{k+1}$ |
| 7:    Compute $\log(\pi_{post}(\xi_{k+1}\mid d))$ from the PCE surrogate |
| 8:    Calculate the correction factor $c = \frac{q(\xi_{k+1}, \xi_k)}{q(\xi_k, \xi_{k+1})}$; |
| 9:    Compute α($\xi_k$, $\xi_{k+1}$) defined as $\alpha(\xi_k, \xi_{k+1}) = \log\left(\min\left\{1, \frac{\pi_{post}(\xi_{k+1} \mid d)}{\pi_{post}(\xi_k \mid d)} \cdot c\right\}\right)$; |
| 10:   Draw u ~ U([0,1]) |
| 11:   if log (u) < α($\xi_k$, $\xi_{k+1}$) then |
| 12:     Accept: Set $\xi_{k+1}$ = $\xi_{k+1}$; |
| 13:   else |
| 14:     Reject Set $\xi_{k+1}$ = $\xi_k$; |
| 15:   end if |
| 16:  end for |
| 17:  Mapping samples of ξ back to m, then plot the PDF of $\pi_{post}$(m\|d), and find the MAP points. |

Example Embodiments Based on Hybrid MCMC Techniques

To further reduce the large sample size required in conventional MCMC approaches, a two-stage hybrid MCMC algorithm can be used (e.g., in operation 130 shown in FIG. 1). The first stage is based on the gradient-based Langevin MCMC (LMCMC) algorithm as this algorithm enables a better convergence rate when the dimension is large or when bad priors are assumed. Its gradient information can be obtained easily from the PCE coefficients. The second stage is based on the adaptive MCMC algorithm, which can achieve an accurate estimation when strong correlations between the parameters exist.

As discussed above, the Langevin dynamics enables the LMCMC to have a better convergence rate than the MHMCMC. This benefit tends to increase when the dimension increases. This is especially the case for the decentralized dynamic parameter estimation problem, where several generator dynamic parameters can influence the dynamic performance of power systems. However, analyzing the gradient information in LMCMC can take extra computing time. Also, the selection of the step size t can influence the search path for the global optimum. Once the LMCMC sampler is approaching the local optima, it may not jump out of the local optimum when t is too small. In contrast, when t is too large, the acceptance rate becomes low. To obtain unbiased results, the sample size must be increased significantly.

Adaptive MCMC (AM) strategy (also referred to as hybrid MCMC) is to create a Gaussian proposal distribution function with a covariance matrix calibrated using the previous samples in the MCMC chain. The key point of the AM adaptation is how the covariance of the proposal distribution function depends on the history of the chain. After an initial nonadaptive period, the Gaussian proposal function is centered at the current position of the Markov Chain, $m_k$, and resets its covariance $C_k$. This can be expressed as:

$$C_k = \begin{cases} C_0 & k \leq k_0 \\ s_N Cov(m_0, \ldots, m_{k-1}) + s_N \epsilon I_N & k > k_0 \end{cases} \quad \text{Eq. (30)}$$

where, $C_0$ denotes initial covariance chosen according to a prior knowledge (which may be quite poor), $k_0$ denotes a time index that defines this initial nonadaptive period, $s_N$ denotes the scaling parameter, $\epsilon$ is a small constant to ensure the non-singularity of $C_k$, and $I_N$ denotes N-dimensional identity matrix. The larger $k_0$ is, the longer it takes for the adaptation to take place. This adaptation mechanism enables the AM algorithm to overcome local optima caused by the strong correlation between the parameters and to choose the appropriate variance values for the proposal function. In some embodiments, the adaptation can be done at given intervals. Some simulation results of the HMS method have been compared with the MC method with 1,000,000 samples of power-flow cases. Compared to the MC method execution that requires approximately 1.5 h to complete all the tests, the HMS method execution requires only about 1 min. The HMS method can also provide equally accurate simulation results even for risk events with a very low probability, e.g., $10^{-4}$ or $10^{-5}$. An example algorithm that uses the adaptive MCMC framework for parameter estimation is illustrated by the following pseudo code:

---

Algorithm PCE-based Bayesian Inference using the Hybrid MCMC for Decentralized Dynamic Parameter Estimation 1: Choose the initial guess of the parameters $m_0$ from the manufactured data as the means of Bayesian prior $m_{prior}$;
2: Map m into $\xi$, build the PCE surrogates as the response surface of the decentralized dynamic model;
3: Compute ANOVA index . Find the effective dimensions and ignore the ineffective ones;
4: Compute $\log(\pi_{post}(\xi_0|d))$ from
5:    for $k = 0, \ldots, N_{LMCMC} - 1$ do
6:       Compute $\nabla\log(\pi_{post}(\xi_k|d))$
7:       Generate new sample $\xi_{k+1}$
8:       Compute $\log(\pi_{post}(\xi_{k+1}|d))$
9:       Compute $\alpha(\xi_k, \xi_{k+1})$ defined as $$\alpha(\xi_k, \xi_{k+1}) = \log\left(\min\left\{1, \frac{\pi_{post}(\xi_{k+1} \mid d)}{\pi_{post}(\xi_k \mid d)} \cdot c\right\}\right);$$

10:       Draw $u \sim U([0,1])$
11:       if $\log(u) < \alpha(\xi_k, \xi_{k+1})$ then
12:          Accept: Set $\xi_{k+1} = \xi_{k+1}$;
13:       else
14:          Reject Set $\xi_{k+1} = \xi_k$;
15:       end if
16:    end for
17:    for $k = N_{LMCMC}, \ldots, N_{samples} - 1$ do
       Update covariance $C_k$ for proposal distribution based on the samples generated in the AM stage with the interval set as $N_{interval}$;
19:       Generate a new sample $\xi_{k+1}$ from $q(\xi_k, \cdot)$ with its covariance $C_k$;
20:       Compute $\log(\pi_{post}(\xi_{k+1}|d))$
21:       Repeat M – H mechanism shown in Steps 9-15;
22:    end for
23:    Map samples of $\xi$ back to m, then plot the pdf of $\pi_{post}(m|d) >$ and find the MAP points.

---

Example Embodiments Based on Hybrid Models

Although the techniques described above obtain an accurate PCE-based surrogate model, the topological uncertainties in the probabilistic power-flow (PPF) analysis are not fully accounted for. Thus, the PCE-based surrogate model can be inadequate for problems involving model discontinuities, because the construction of the surrogate model is based on the smoothness assumption of the system response. However, when the topology of a power system changes due to random branch outages, system responses tend to have abrupt changes that violate this assumption. This is especially true for the rare events involving high-order contingencies. To address these challenges, the sampling of the surrogate and original system models (e.g., operation 130 in FIG. 1) can be combined using a hybrid method, also referred to as the Hybrid Multi-surrogate (HMS). For most of samples that are located "away" from the limit state for the Quantity of Interest (QoI), the samples of the surrogate models are used. For the samples located "close" to the limit state of the QoIs, the samples are reevaluated through the original system model. By doing so, only a small portion of the samples are obtained from the original system mode. Thus, the overall cost is much cheaper than the one obtained by sampling using the power system model. Furthermore, this reevaluation stage, also known as a two-stage MC method (e.g., as described in Example Embodiments based on Hybrid MCMC Techniques), prevents loss of accuracy coming from the direct usage of the surrogate-based method.

Every system topology can be deemed as a single element. Thus, multiple elements can be associated with different system topologies. Within every single element, a corresponding surrogate model can be constructed that only considers the nodal power-injection uncertainties. However, the number of possible topologies caused by random branch outages is directly proportional to the number of system branches. Even for a very-small-scale power system, modeling all possible combinations of these topologies can be computationally infeasible. Thus, there is a need to consider the balance between the construction of the surrogate model and the usage of the direct MC method.

Following the power system planning tradition, different system topologies can be classified N−1, N−2, N−3, etc. criteria. Apart from the original system model without branch outages, the contingencies of the N−1 criterion occur more frequently than those of the higher-order criteria, e.g., the N−2 and the N−3 criteria, as shown in Table 1.

TABLE 1

Example Transmission Outage at 230 kV and above

| Type  | N-1   | N-2 | N-3 | N-4 | N-5 | N-6 | N-7 | N-8 |
|-------|-------|-----|-----|-----|-----|-----|-----|-----|
| Count | 10143 | 951 | 143 | 36  | 8   | 2   | 4   | 2   |

For the original system model without any branch outages and for the N−1 criterion, the idea of "multi-element" is maintained and $N_{branch}+1$ surrogate models are constructed separately. For the topologies corresponding to N−2 and higher-order contingencies, the traditional MC method without constructing any surrogate model.

Constructing the PCE-based surrogate model depends on the realizations at a small number of collocation points and accounts for nearly all the computational cost associated with using the surrogate model. Once the surrogate model is constructed, the realizations of a large number of samples through this surrogate model can be computationally negligible. However, if the number of samples that need to be propagated through the surrogate model is very small, e.g., 2, 1, or even 0, then the construction of the surrogate model itself already becomes computationally more expensive than directly using the original system model. In these cases, using direct MC simulations is more cost-effective.

Figure 6:
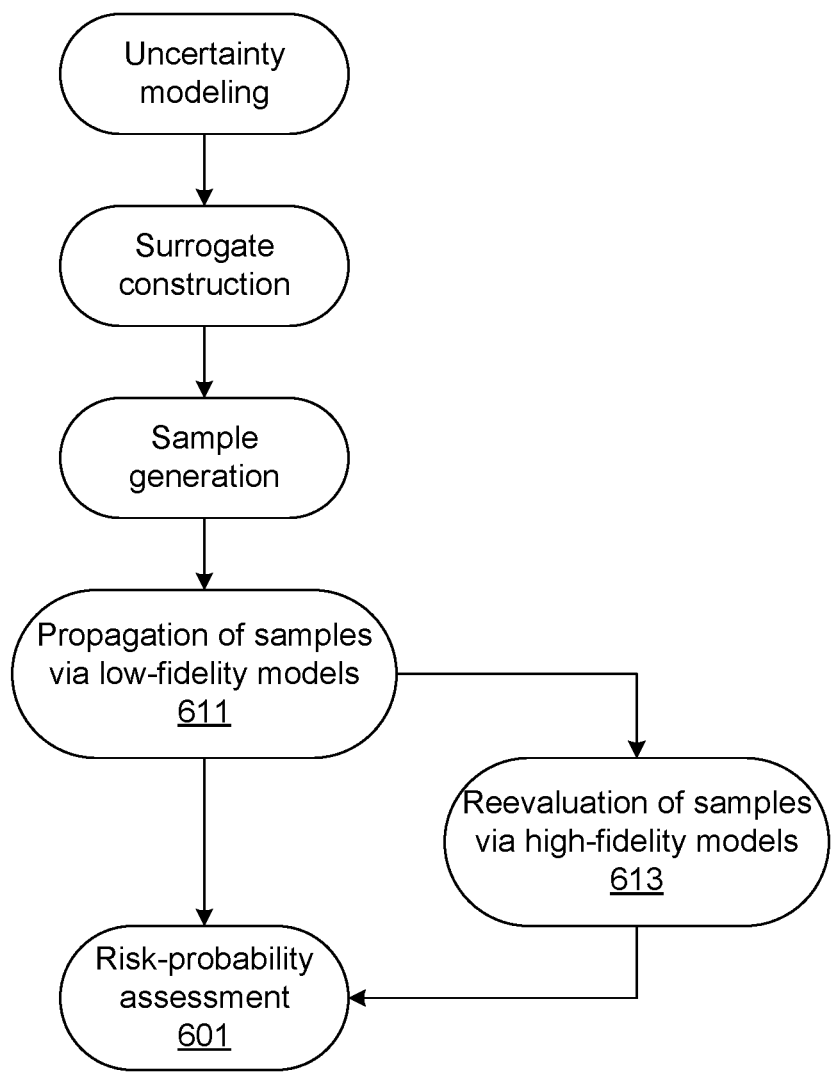
FIG. 6 is a flowchart representation of an example risk-probability assessment via a Hybrid Multi-Surrogate (HMS) method in accordance with the present disclosure.

FIG. 6 is a flowchart representation of an example risk-probability assessment via the HMS method in accordance with the present disclosure. As shown in FIG. 6, the risk-probability assessment 601 is performed using both low-fidelity models 611 and high-fidelity models 613. An example algorithm of risk-probability assessment using the HMS method is provided by the following pseudo code:

| Algorithm Risk Assessment via the HMS Algorithm |
|---|
| 1: Model the uncertainties with their associated pdfs, including the uncertainties from load variations and branch states; choose the QoI for risk assessment; |
| 2: Only considering the uncertainties of nodal power injections, contruct the PCE-based surrogate model of the system without branch outage; |
| 3: for k = 1,...,$N_{branch}$ do |
| 4:     Set Branch k in an "off" state and all the other branches in "on" states: then, construct a PCE-based surrogate model by only considering the nodal power-injection uncertainties; |
| 5: end for |
| 6: Generate $N_m$ samples as $\{m^{(j)}\}_{j=1}^{N_m}$, including uncertainties for nodal power injections and branch states; |
| 7: for j = 1,...,$N_m$ do |
| 8:     Classify $m^{(j)}$ into different types of contingencies, i.e., N − 0, N − 1, N − 2, etc. |

| Algorithm Risk Assessment via the HMS Algorithm |
|---|
| 9:     if $m^{(j)}$ belongs to N − 0 or N − 1 cases then |
| 10:         Find the corresponding surrogate model for $m^{(j)}$ and compute $z^j$ via its surrogate model $\tilde{f}(m^{(j)})$; |
| 11:         if $z^j$ located in target domain $\tilde{\Omega}_f$ then |
| 12:             Mark sample $m^{(j)}$ for reevaluation; |
| 13:         end if |
| 14:     else |
| 15:         Compute $z^j$ via original system model $f(m^{(j)})$; |
| 16:     end if |
| 17: end for |
| 18: Reevaluate all the samples marked in Step 12 via $f(m^{(j)})$; |
| 19: Perform risk assessment |

Example Embodiments Based on Importance Sampling (IS)

In some embodiments, importance sampling and adaptive importance sampling can be incorporated in the PCE-based Bayesian Inference frame (e.g., in operation 120 as shown in FIG. 1) to improve the accuracy of the posterior PDFs.

The Importance Sampling (IS) method includes drawing K independent samples $\{x^{(k)}\}_{k=1}^{K}$ from the proposal PDF, q(x), which has heavier tails than the target function π(x). Each sample has an associated importance weight given by (k=1, 2, . . . , K):

$$w^{(k)} = \frac{\pi(x^{(k)})}{q(x^{(k)})} \qquad \text{Eq. (31)}$$

The PDF q(x) comes from the Bayesian prior pdf $\pi_{prior}(x)$, and the target function comes from the Bayesian posterior pdf $\pi_{post}(x|z)$. This enables a sample set from $\pi_{prior}(x)$ to represent parameter uncertainties and evaluate the weight at each parameter value through $$w^{(k)} = \frac{\pi_{post}(x^{(k)}|z)}{\pi_{prior}(x^{(k)})}.$$

The normalized with can be calculated as $$\bar{w}^{(k)} = \frac{w^{(k)}}{\sum_{i=1}^{K} w^{(i)}}$$

and the full probability distributions of $\pi_{post}(x|z)$ can be recovered as:

$$\pi_{post}(x|z) = \Sigma_{k=1}^{K} \bar{w}^{(k)} \delta(x - x^{(k)}) \qquad \text{Eq. (32)}$$

Here, δ represents Dirac-delta function. The estimated model parameters via a maximum-a-posteriori (MAP) estimator can be expressed as:

$$\hat{x}_{MAP} = \underset{m}{\text{argmin}}\{-\pi_{post}(x|z)\} \qquad \text{Eq. (33)}$$

An example algorithm of importance-sampling-based Bayesian Inference is illustrated by the following pseudo code:

| Algorithm Importance-Sampling-Based Bayesian Inference for Generator Parameter Estimation |
|---|
| 1:    Set Bayesian prior $\pi_{prior}(m)$ based on the manufacturer data |
| 2:    Draw sample set, $\{m^{(k)}\}_{k=1}^{K}$, from $\pi_{prior}(m)$; |
| 3:    Construct the decentralized generator model |
| 4:    for k = 1,...,K do |
| 5:      Evaluate Bayesian posteriors's likelihood at sample values for $\pi_{post}(m^{(k)}|d)$ via |
| 6:      Evaluate weights for all samples |
| 7:      Normalize the weights |
| 8:    end for |
| 9:    Recover the pdfs for $\pi_{post}(m|d)$ |
| 10:    Use MAP to estimate parameters |

An example algorithm of PCE-based Bayesian Inference via Importance Sampling is illustrated by the following pseudo code:

| Algorithm PCE-based-Bayesian Inference via IS in Generator Parameter Estimation |
|---|
| 1:    Set Bayesian prior $\pi_{prior}(m)$ based on manufacturer data; |
| 2:    Based on $\pi_{prior}(m)$, construct PCE-based surrogate model $z(\zeta)$ over the selected sample space for the decentralized generator model; |
| 3:    Draw sample set, $\{m^{(k)}\}_{k=1}^{K}$, from $m_{prior}$; |
| 4:    for k = 1,...,K do |
| 5:      Evaluate Bayesian prior and posteriors likelihood at sample values for $\pi_{post}(m^{(k)}|d)$ |
| 6:      Evaluate weights for all samples |
| 7:      Normalize the weights |
| 8:    end for |
| 9:    Mapping samples of $\zeta$ back to m and recover the pdfs for $\pi_{post}(m|d)$ via (10) |
| 10:    Use MAP to estimate parameters |

The Adaptive IS (AIS) method is based on an iterative process for gradual evaluation of the proposal functions to accurately approximate the posterior functions. The AIS method includes three steps: (i) generate samples from proposal functions; (ii) calculate weights for samples; and (iii) update the scale and location parameters that define the proposals to obtain the new proposal for further iterations.

More specifically, for parameter estimation problem with N unknown parameters, the AIS algorithm is initialized with a set of N proposals. Each proposal is parameterized by a vector that comes from Bayesian prior pdfs $\pi_{prior}(x)$. After drawing a set of samples $\{x^{(k)}\}_{k=1}^{K}$, the normalized weights can be determined. These weights enable a determination of a discrete probability distribution that approximates the target Bayesian posteriors $\pi_{post}(x)$. Then, the parameters of the nth proposal are updated based on $\pi_{post}(x)$. This process is repeated until an iterative stopping criterion is satisfied. This updating enables the system to find better Bayesian priors that not only propose more samples in the sample space with high likelihood, but also fine-tune the sample space to construct new surrogate models, thereby improving the fidelity. An example algorithm of multifidelity-surrogate-based Bayesian Inference via AIS is illustrated by the following pseudo code:

| Algorithm Multifidelity-Surrogate-Based Bayesian Inference via AIS in Generator Parameter Estimation |
|---|
| 1:    Set Bayesian prior $\pi_{prior}(m)$ based on manufacture data ; Initiate $\{\Theta_{n,0}\}_{n=1}^{N}$; |
| 2:    Initiate iteration number j; |
| 3:    while (stopping criterion is not met) do |
| 4:      for k = 1,...,K do |
| 5:        Based on $\pi_{prior}(m)$, construct PCE-based surrogate model over the selected sample space $U([m_{min}, m_{max}])$ for the decentralized generator model; |
| 6:        Draw sample set, $\{m^{(k)}\}_{k=1}^{K}$, from $m_{prior}$; |
| 7:        Evaluate Bayesian prior and posterior likelihood at sample values for $\pi_{post}(m^{(k)}|d)$ |
| 8:        Evaluate weights for all samples |
| 9:        Normalize the weights |
| 10:        Map samples of $\zeta$ back to m and recover the pdfs for $\pi_{post}(m|d)$ |
| 11:        Use MAP to estimate parameters |
| 12:        Update $\{\Theta_{n,j-1}\}_{n=1}^{N}$ to $\{\Theta_{n,j}\}_{n=1}^{N}$ from $\pi_{post}(m|d)$ to get new sample space $U([m_{min}, m_{max}])$ and new $\pi_{prior}(m)$. |
| 13:      end for |
| 14:      Update j = j + 1; |
| 15    end while |
| 16:    Read the estimation results for generator parameters. |

Example Embodiments Based on Stochastic Economic Dispatch (SED)

The techniques disclosed herein can also be applied to stochastic economic dispatch (SED) for the increasing penetration of renewable energy resources. A SED method based on Gaussian process emulator (GPE) can be implemented for power system. The GPE can evaluate, with a negligible computational cost, the SED solver at sampled values through a nonparametric reduced order representation.

The GPE is known to be a powerful Bayesian-learning-based method based on a nonlinear regression problem. The SED model can be denoted as f(•) and its corresponding vector-valued input of p dimensions by x. Due to the randomness of x, n samples can be observed as a finite collection of the input as $\{x_1, \ldots, x_n\}$. Accordingly, its model output f(x) also becomes random and has its corresponding n realizations, denoted by $\{f(x_1), \ldots, f(x_n)\}$.

Assuming that the model output is a realization of Gaussian process, then the finite collection of the random variables follows a joint multivariate model probability distribution:

$$\begin{bmatrix} f(x1) \\ \vdots \\ f(xn) \end{bmatrix} \sim N\left( \begin{bmatrix} m(x1) \\ \vdots \\ m(xn) \end{bmatrix}, \begin{bmatrix} k(x1, x1) & \ldots & k(x1, xn) \\ \vdots & \ddots & \vdots \\ k(xn, x1) & \ldots & k(xn, xn) \end{bmatrix} \right) \quad \text{Eq. (34)}$$

where, m(•) is the mean function, and k(•,•) is a kernel function that represents the covariance function. Eq. (34) can be simplified into f(X)|X~N(m(X),k(X,X)) where X=[x1, x2, ..., xn]$^T$. Adding the observation noise into f(X) yields Y=f(X)+e, e~N(0,$\sigma^{-2}I_n$) where $I_n$ and $\sigma^2$ are an n-dimensional identify matrix and variance respectively. A similar Bayesian inference can be applied to {Y, X}. A joint distribution of Y and y(x) can be formulated as:

$$\begin{bmatrix} Y \\ y(x) \end{bmatrix} \sim N\left( \begin{bmatrix} m(X) \\ m(x) \end{bmatrix}, \begin{bmatrix} K_{11} & K_{12} \\ K_{21} & K_{22} \end{bmatrix} \right) \quad \text{Eq. (35)}$$

where, $K_{11}=k(X,X)+\sigma^2 I_n$, $K_{12}=k(X,x)$, $K_{21}=k(x,X)$, and $K_{22}=k(x,x)+\sigma^2 I_n$. The Bayesian posterior distribution of the system output y(x) conditioned upon the observations (Y,X) follows a Gaussian distribution is given by:

$$y(x)|x,Y,X \sim N(\mu(x),\Sigma(x)) \quad \text{Eq. (36)}$$

$$\mu(x)=m(x)+K_{21}K_{11}^{-1}(Y-m(X)) \quad \text{Eq. (37)}$$

$$\Sigma(x)=K_{22}-K_{21}K_{11}^{-1}K_{12} \quad \text{Eq. (38)}$$

The form of GPE (e.g., operation 120-140 as shown in FIG. 1) can be derived as described above. Take a wind farm as an example, the dimension for the random fields representing wind-farm generation may be so high that the GPE cannot be constructed efficiently. To allow efficient construction of the GPE model, a dimensionality reduction can be performed. In some embodiments, the dimensionality reduction (e.g., operation 110 as shown in FIG. 1) is performed using a Karhunen-Loeve expansion (KLE) instead of the KPCA described above.

The high-dimensional samples can be projected into low-dimensional latent variables using the KLE. Each random variable X(t) is indexed by t. Assuming that X(t) for any time has a finite variance and the covariance function C is defined as C(t,s)=Cov(X(t),X(s)). Because C is positive definite, the spectral decomposition is:

$$C(t,s)=\Sigma_{i=1}^{\infty}\lambda_i u_i(t)u_i(s) \quad \text{Eq. (39)}$$

where, $\lambda_i$ denotes the ith eigenvalue and $u_i$ denotes the ith orthonormal eigenfunction of C. X(t) can be input into the KLE framework as follows:

$$X(t)=\Sigma_{i=1}^{\infty}\sqrt{\lambda_i}u_i(t)\xi_i \quad \text{Eq. (40)}$$

where, $\xi_i$ are mutually correlated univariate random variables with zero mean and unit variance.

The dimension reduction can also be presented from the variance point of view. Consider the total variance of X(t) over a bounded domain D. Using the orthonormality property of $u_i(t)$, we have:

$$\int \text{Var}[X(t)]dt=\Sigma_{i=1}^{\infty}\lambda_i \quad \text{Eq. (41)}$$

The first p largest eigenvalues can be chosen as $\{\lambda_1, \ldots, \lambda_p\}$, with the corresponding eigenfunctions as $\{u_1, \ldots, u\}$ such that the obtained contain over 95% of the total variance. Since the calculated p is smaller than the original dimension of the raw data sequence, the KLE has mapped the high-dimensional correlated X to the low-dimensional uncorrelated $\xi$. Simulation results have shown that an example GPE surrogate, trained with 100 Latin hypercube simulations, can successfully calculate the SED values for the tested system under 8,000 scenarios, which is significantly more computationally efficient than the traditional Monte Carlo method while achieving the desired simulation accuracy. An example algorithm for the GPE-based SED method is illustrated by the following pseudo code:

| Algorithm The Proposed GPE-based SED Method |
|---|
| 1: Read the historical raw data of the wind farms; |
| 2: Apply the KLE on the preprocessed data to obtain p-dimensional truncated data; |
| 3: Estimate the closed-form solution for the joint pdf of $\zeta$; |
| 4: Regenerate a large number of samples as the model input through the pdf obtained from the kernel density estimation; |
| 5: Generate p-dimensional n training samples X via the Latin hypercube sampling method; |
| 6: Obtain realizations Y by evaluating X through the SED model; |
| 7: Estimate the hyperparameters η given the training set (Y, X) for the GPE-based surrogate model; |
| 8: Propagate a large number of samples of the model input through the GPE-based surrogate models to obtain the SED system output realizations; |
| 9: Calculate the statistical moments of the SED output Q(g, p($\zeta$)). |

Example Embodiments Based on Manifold-Learning Based Isomap

In some embodiments, to reduce the dimension for the GPE-based surrogate model described above, a manifold-learning based Isomap method is used (e.g., in operation 110 as shown in FIG. 1). This nonlinear dimensionality-reduction technique allows to preserve the low-dimensional embedding of the data compared with the linear-transformation-based KLE method. Furthermore, a kernel density estimator (KDE) is used to obtain the closed-form probability of the density functions instead of relying on the normality assumption for the latent variables.

Starting from creating a neighborhood network using k-nearest neighbors based on local Euclidean distances for the high-dimensional raw data, the internal nonlinear manifold structure of the data set is revealed by the geodesic distance between all pairs of points approximated from the local Euclidean distances in the neighborhood network. By applying eigenvalue decomposition on the approximated geodesic distance matrix, the low-dimensional embedding of the data set can be preserved efficiently for a nonlinear manifold.

Denote the raw data before dimensionality reduction as an $n \times p_{raw}$ matrix expressed as W, where $p_{raw} > p$. The goal is to use Isomap to transform W into a matrix X that can be effectively adopted to construct the GPE as described above. The Isomap can be determined based on three main steps: creating neighborhood graph, obtaining geodesic of ISomap, and eigen-decomposition of Isomap.

(1) Neighborhood Graph

A weighted graph G can be expressed as G(V,E,L) where V is the set of vertices and E is the set of edges with corresponding lengths L. To construct the graph G from the draw data W, n observations in W can be used to represent n vertices. Between any two of vertices, $w_i$ and $w_j$, their pairwise Euclidean distance is denoted as $\delta_{i,j}$. A n×n matrix can be formed to represent the Euclidean distance information between all vertices. The edges can be assigned accordingly based on the vertices. Using these vertices and edges, the topology of a graph can be generated. In general, a properly small k is helpful in classifying different groups of individuals. A large K, on the other hand, provides more concentrated embedding.

(2) Geodesic Calculation

Given the graphs and the Euclidean distances, the geodesic distance (shortest path) between ith and jth vertices $d_{i,j}$ can be found. For example, the Dijkstra's algorithm can be applied to find the shortest path.

(3) Eigen-Decomposition

The Isomap objection function can be defined as follows:

$$U(X) = \min_X \|\tau(D) - \tau(D_X)\|_F \quad \text{Eq. (42)}$$

Here, τ(D) stands for the shortest-path inner product matrix. $D_X$ is symmetric, hollow matrix of the Euclidean distance. τ($D_X$) denotes the Euclidean inner product matrix and $\|\cdot\|$ is the Frobenius matrix norm. From Eq. (37), the global minimum can be obtained by the largest p eigenvectors of τ(D). τ(D) is then reformed as $$\tau(D) = \frac{1}{2} J D^{(2)} J.$$

The embedding X is obtained as $$X = \left( \lambda_1^{\frac{1}{2}} v_1, \ldots, \lambda_p^{\frac{1}{2}} v_p \right)$$

where $\{\lambda_s\}_{s=1}^{p}$ denotes the first p eigenvalues of τ(D) and $\{v_s\}_{s=1}^{p}$ are the corresponding eigenfunctions. Simulation results have shown that the GPE surrogates with Isomap offers comparable results as the GPE surrogates with KLE. The GPE-Isomap method can embed input into a lower dimensionality, e.g., 9 latent variables. With the ability to explore much-lower-dimensional representations, the techniques disclosed herein can be applied to handle larger-scale systems.

Figure 7A:
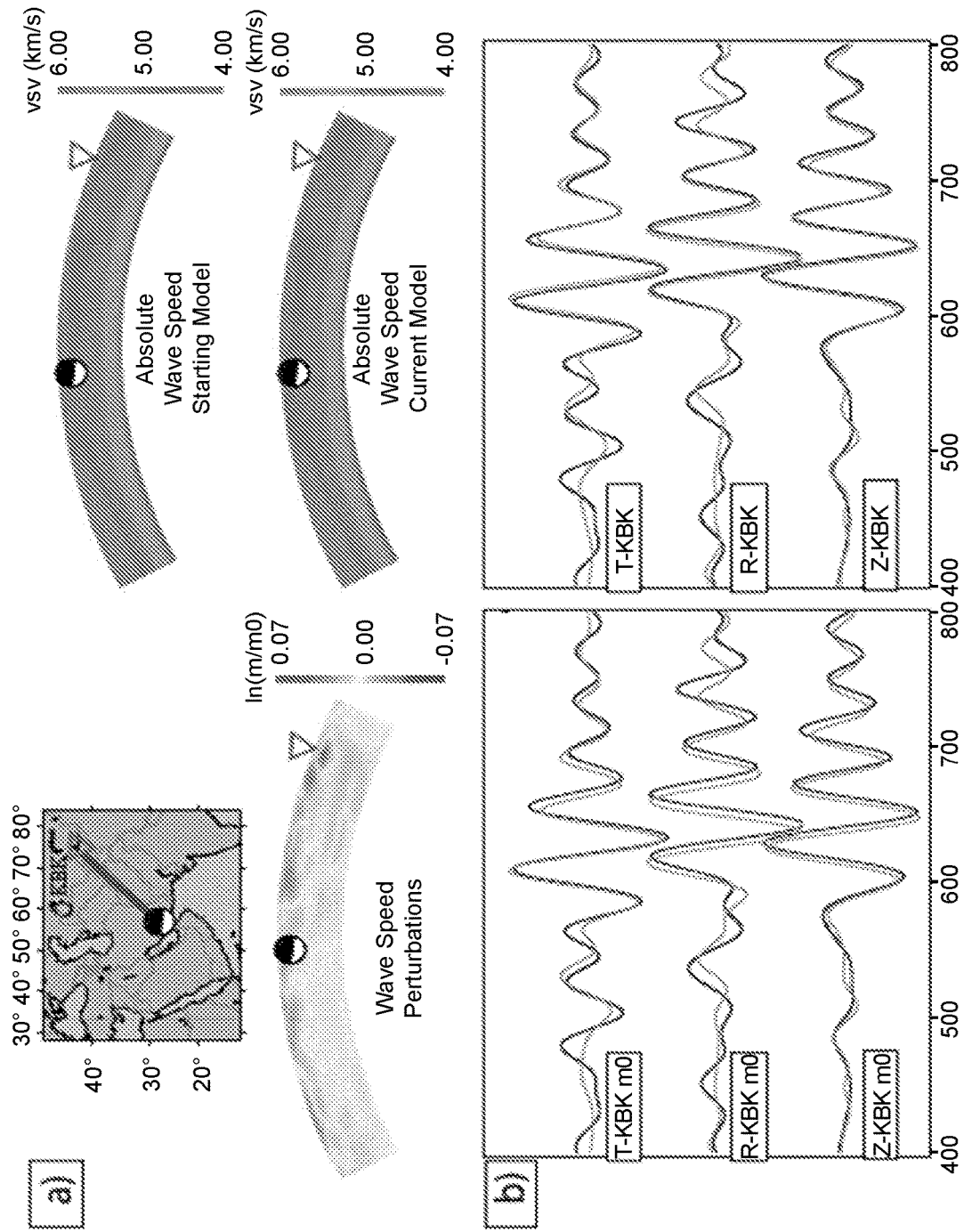
FIG. 7A illustrates a wave speed field estimated based on waveform measurements.
Figure 7B:
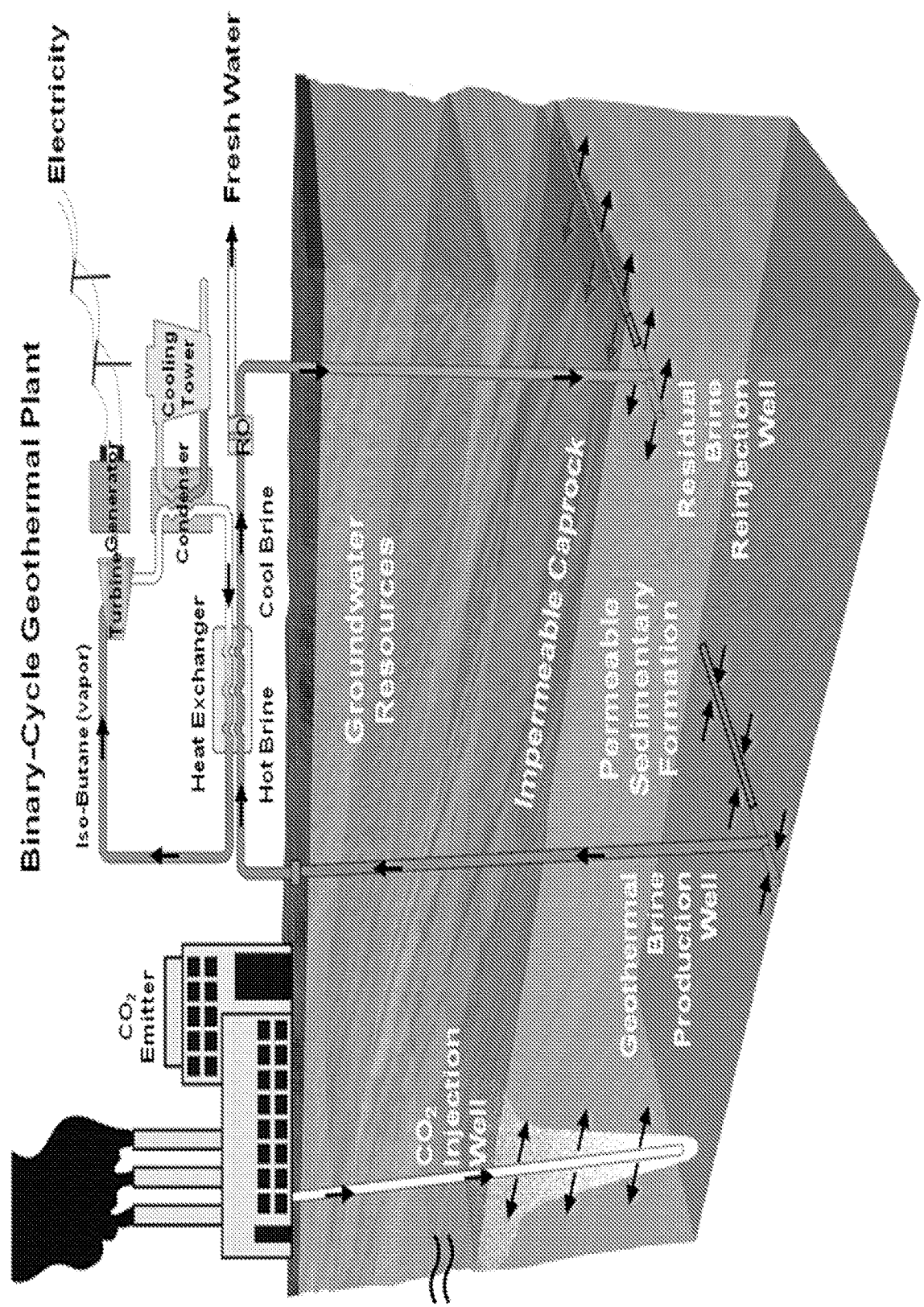
FIG. 7B illustrates a permeability field estimated based on pressure measurements.
Figure 7C:
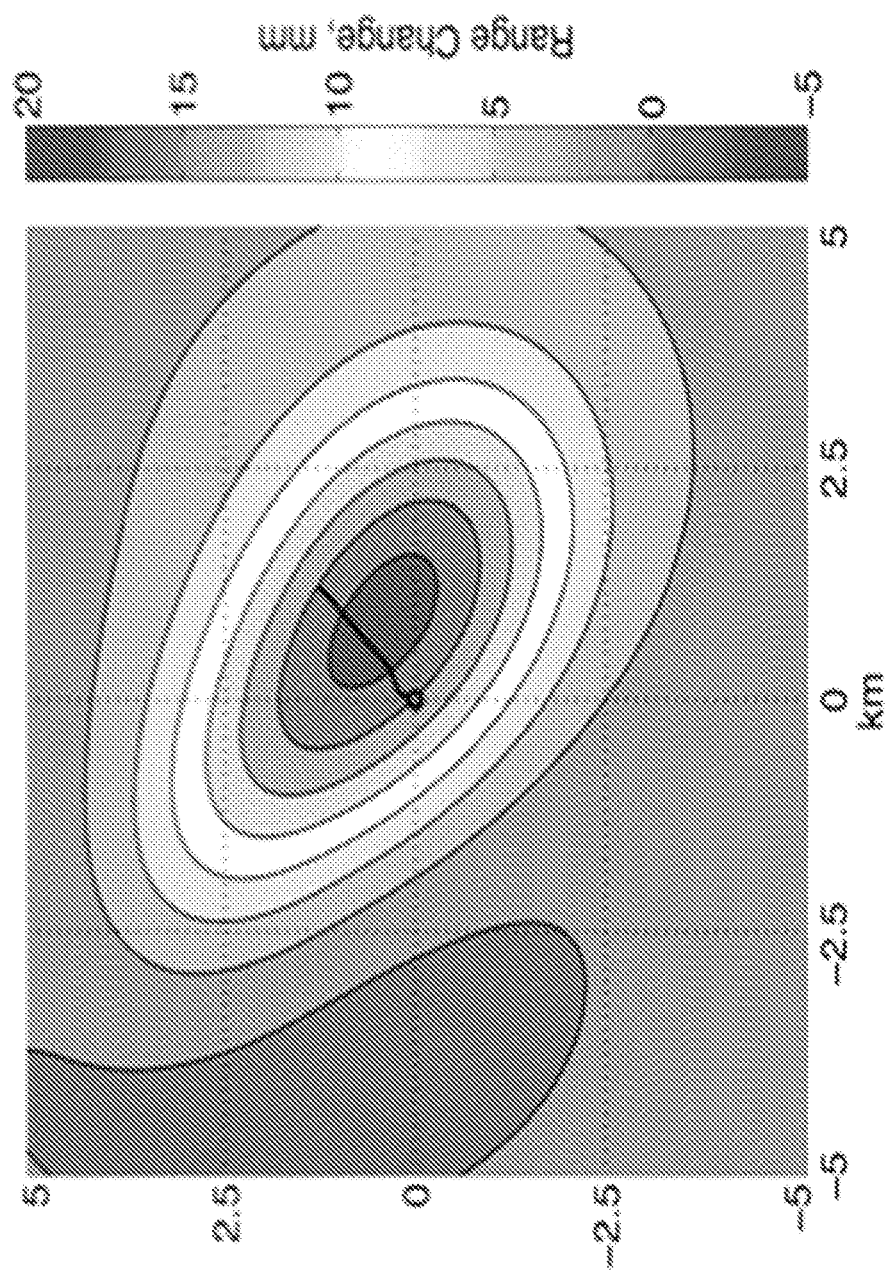
FIG. 7C illustrates a subsurface structure estimated based on measurements of surface deformations.

While the embodiments focus on the application of power systems, the techniques described herein can also be applied to study other stochastic behaviors. FIGS. 7A-7C illustrate example applications of the disclosed techniques in accordance with the present disclosure. For example, FIG. 7A shows that a wave speed field can be estimated based on waveform measurements. Similarly, pressures from sensors can be used to derive the permeability field as shown in FIG. 7B. FIG. 7C shows an example of determining subsurface structure based on measurements of surface deformations.

Figure 8:
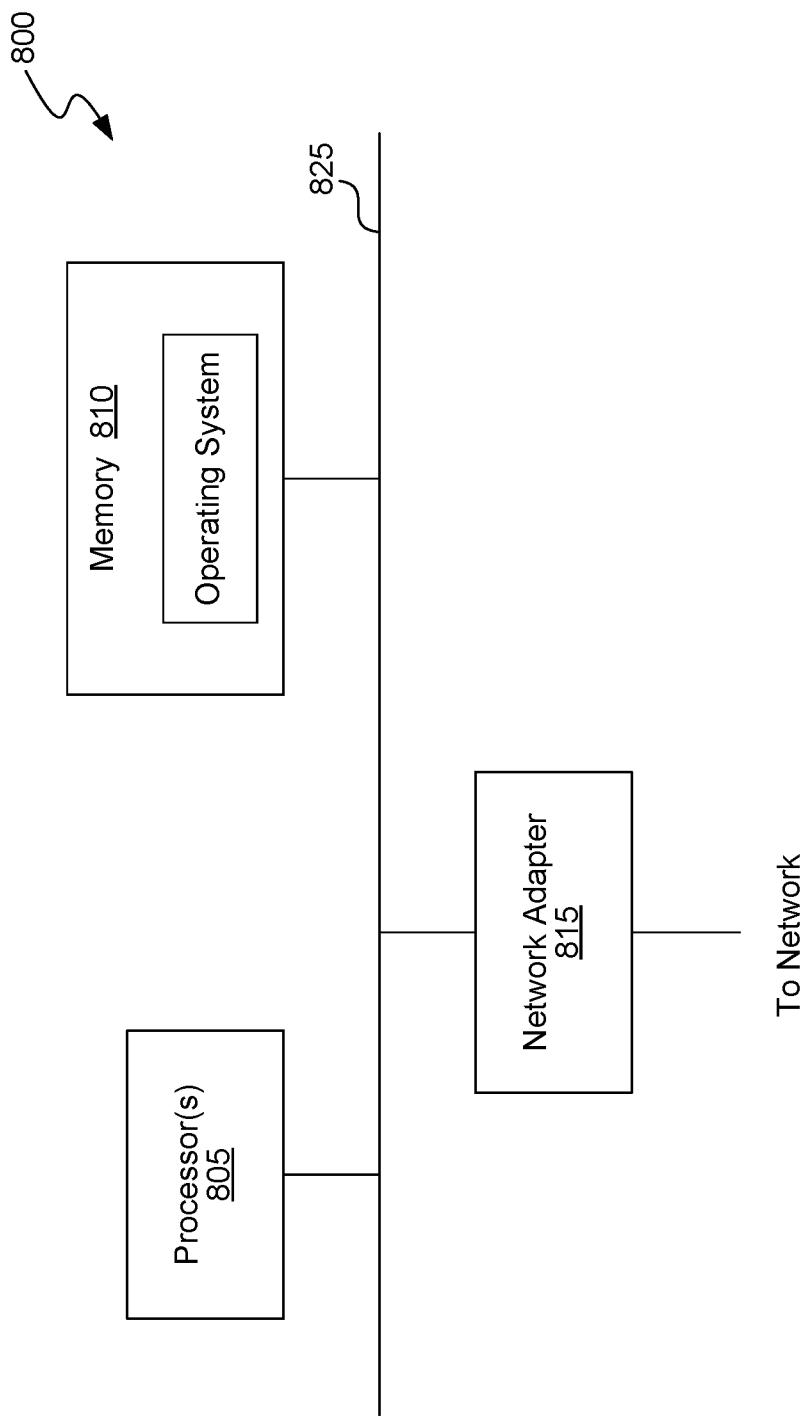
FIG. 8 is a block diagram illustrating an example of the architecture for a computer system or other control device that can be utilized to implement various portions of the present disclosure.

FIG. 8 is a block diagram illustrating an example of the architecture for a computer system 800 or other control device that can be utilized to implement various portions of the present disclosure. In FIG. 8, the computer system 800 includes one or more processors 805 and memory 810 connected via an interconnect 825. The interconnect 825 may represent any one or more separate physical buses, point to point connections, or both, connected by appropriate bridges, adapters, or controllers. The interconnect 825, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 805 may include central processing units (CPUs), graphics processing units (GPUs), or other types of processing units (such as tensor processing units) to control the overall operation of, for example, the host computer. In certain embodiments, the processor(s) 805 accomplish this by executing software or firmware stored in memory 810. The processor(s) 805 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 810 can be or include the main memory of the computer system. The memory 810 represents any suitable form of random access memory (RAM), read-only memory (ROM), flash memory, or the like, or a combination of such devices. In use, the memory 810 may contain, among other things, a set of machine instructions which, when executed by processor 805, causes the processor 805 to perform operations to implement embodiments of the presently disclosed technology.

Also connected to the processor(s) 805 through the interconnect 825 is a (optional) network adapter 815. The network adapter 815 provides the computer system 800 with the ability to communicate with remote devices, such as the storage clients, and/or other storage servers, and may be, for example, an Ethernet adapter or Fiber Channel adapter.

In one example aspect, a system for performing numerical estimation comprises a plurality of sensors configured to collect a set of measurements of a stochastic behavior. The set of correlated measurements follows a non-standard probability distribution and is non-linearly correlated. A non-linear relationship exists between a set of system variables that describes the stochastic behavior and a corresponding set of measurements. The system also includes a processor coupled to the plurality of sensors and a memory including processor executable code. The processor executable code upon execution by the processor configures the processor to determine, based on the set of measurements, a numerical model of the stochastic behavior. The numerical model comprises a feature space comprising non-correlated features corresponding to the stochastic behavior. The non-correlated features have a dimensionality of M and the set of measurements has a dimensionality of N, M being smaller than N. The processor is also configured to generate a set of approximated system variables according to the set of measurements based on the numerical model.

In some embodiments, the processor is configured to determine the feature space based on a statistical transformation that converts a first set of correlated values into a second set of uncorrelated values having a lower dimensionality. In some embodiments, statistical transformation comprises a kernel principal component analysis. In some embodiments, the statistical transformation comprises a Karhunen-Loeve expansion. In some embodiments, the statistical transformation comprises a manifold-learning based Isomap construction.

In some embodiments, the non-correlated features in the feature space follow a non-standard probability distribution. In some embodiments, the processor is configured to map the feature space to a set of variables representing the numerical model prior to generating the set of approximated system variables. The set of variables follows a standard probability distribution. In some embodiments, the processor is configured to map the feature space to the set of variables based on a response surface approach. In some embodiments, the response surface approach comprises a polynomial chaos expansion.

In some embodiments, the processor is configured to sample the numerical model based on a statistical inference approach to determine the set of approximated system variables. In some embodiments, the statistical inference approach comprises a Metropolis-Hasting Markov Chain Monte Carlo (MCMC) approach. In some embodiments, the statistical inference approach comprises a Langevin MCMC approach. In some embodiments, the statistical inference approach comprises combining a Langevin MCMC approach and an adaptive MCMC that calibrates a covariance of a distribution function based on a history of a Markov Chain.

In some embodiments, the stochastic behavior is associated with one or more target domains. The processor is configured to determine a second numerical model of the stochastic behavior. The second numerical model comprises a space having a same dimensionality of N. The processor is configured to generate the set of approximated system variables based on sampling the numerical model using a first statistical inference approach; and reevaluating a subset of samples in the one or more target domains based on the second numerical using a second statistical inference approach. In some embodiments, the one or more target domains corresponds to one or more failure events with corresponding probabilities of occurrences.

In some embodiments, the processor is configured to determine a set of weighted measurements based on evaluating weights for the set of measurements. The numerical model of the stochastic behavior is determined based on the set of weighted measurements. In some embodiments, the weights are evaluated iteratively for the set of measurements.

In some embodiments, the processor is configured to generate the set of approximated system variables based on expanding the non-correlated features having the dimensionality of M to the set of approximated system variables having the dimensionality of N. In some embodiments, the standard probably distribution comprises at least a Gaussian distribution or a Beta distribution. In some embodiments, the processor is configured to update the numerical model based on the set of approximated system variables for a subsequent estimation.

In some embodiments, the stochastic behavior comprises a behavior of a power distribution system. In some embodiments, the power distribution system comprises a renewable energy system.

In yet another example aspect, a non-transitory storage medium has code stored thereon. The code, upon execution by a processor, causes the processor to implement a numerical estimation method that comprises determining, based on the set of measurements, a numerical model of the stochastic behavior. The numerical model comprises a feature space comprising non-correlated features corresponding to the stochastic behavior. The non-correlated features have a dimensionality of M and the set of measurements has a dimensionality of N, M being smaller than N. The method also includes adjusting the feature space such that the non-correlated features follow a standard probability distribution, expanding the feature space having the dimensionality of M to the dimensionality of N, and sampling the expanded feature space based on a statistical inference approach to determine a set of approximated system variables corresponding to the set of measurements. In some embodiments, the numerical estimation method further comprises updating the numerical model based on the set of approximated system variables.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

We claim:

1. A method performed by one or more computing system generating a set of system variables to represent a physical power system having a stochastic behavior, comprising:
receiving a set of measurements relating to one or more power grids in the physical power system, the set of measurements following a non-standard probability distribution and being non-linearly correlated, wherein a non-linear relationship exists between the set of system variables that describes the stochastic behavior and a corresponding set of measurements;
determining, based on the set of measurements, a numerical model of the stochastic behavior of the physical power system, wherein the numerical model comprises a feature space comprising non-correlated features corresponding to the stochastic behavior, wherein the non-correlated features have a dimensionality that is less than the dimensionality of the set of measurements;
sampling the numerical model based on a statistical inference approach to generate a set of approximated system variables corresponding to the set of measurements based on the numerical model, wherein the statistical inference approach comprises combining a Langevin Markov Chain Monte Carlo (MCMC) approach and an adaptive MCMC that calibrates a covariance of a distribution function based on a history of a Markov Chain; and
applying the set of approximated system variables to the physical power system for controlling actions.

2. The method of claim 1, further comprising:
determining a second numerical model of the stochastic behavior, the second numerical model comprising a space having a same dimensionality of N, N being an integer,
wherein the stochastic behavior is associated with one or more target domains, and
wherein generating the set of approximated system variables comprises:
sampling the numerical model using a first statistical inference approach; and
reevaluating a subset of samples in the one or more target domains based on the second numerical model using a second statistical inference approach.

3. The method of claim 2, wherein the one or more target domains corresponds to one or more failure events with corresponding probabilities of occurrences.

4. The method of claim 1, further comprising:
determining a set of weighted measurements based on evaluating weights for the set of measurements, wherein the numerical model of the stochastic behavior is determined based on the set of weighted measurements.

5. The method of claim 4, wherein the weights are evaluated iteratively for the set of measurements.

6. The method of claim 4, wherein the weights are evaluated in an importance sampling procedure performed based on the statistical inference approach.

7. The method of claim 1, wherein generating the set of approximated system variables comprises:
expanding the non-correlated features having the dimensionality of M to the set of approximated system variables having the dimensionality of N, N and M being integers.

8. The method of claim 1, wherein the feature space is based on a statistical transformation that converts a first set of correlated values having a first dimensionality into a second set of uncorrelated values having a second dimensionality that is lower than the first dimensionality.

9. The method of claim 8, wherein the statistical transformation comprises a manifold-learning based Isomap method.

10. The method of claim 1, wherein the numerical model of the stochastic behavior of the physical power system comprises a Gaussian process emulator.

11. A system for generating model of a power system exhibiting a stochastic behavior, comprising:
a plurality of sensors configured to collect a set of measurements of the power system, the set of measurements following a non-standard probability distribution and being non-linearly correlated, and wherein a non-linear relationship exists between a set of system variables that describes the stochastic behavior and a corresponding set of measurements;
a processor coupled to the plurality of sensors; and
a memory including processor executable code, execution of which by the processor causes the system to:
determine, based on the set of measurements, a numerical model of the stochastic behavior, wherein the numerical model comprises a feature space comprising non-correlated features corresponding to the stochastic behavior, wherein the non-correlated features have a dimensionality of M and the set of measurements has a dimensionality of N, wherein M and N are integers, M being smaller than N;
sample the numerical model based on a statistical inference approach to generate a set of approximated system variables according to the set of measurements based on the numerical model, wherein the statistical inference approach comprises combining a Langevin Markov Chain Monte Carlo (MCMC) approach and an adaptive MCMC that calibrates a covariance of a distribution function based on a history of a Markov Chain; and
apply the set of approximated system variables to the power system for controlling actions.

12. The system of claim 11, wherein the stochastic behavior is associated with one or more target domains, wherein the processor is configured to:
determine a second numerical model of the stochastic behavior, the second numerical model comprising a space having a same dimensionality of N, and wherein the processor is configured to generate the set of approximated system variables based on:

sampling the numerical model using a first statistical inference approach; and reevaluating a subset of samples in the one or more target domains based on the second numerical model using a second statistical inference approach.

13. The system of claim 12, wherein the one or more target domains corresponds to one or more failure events with corresponding probabilities of occurrences.

14. The system of claim 11, wherein the processor is configured to:

determine a set of weighted measurements based on evaluating weights for the set of measurements, wherein the numerical model of the stochastic behavior is determined based on the set of weighted measurements.

15. The system of claim 14, wherein the weights are evaluated iteratively for the set of measurements.

16. The system of claim 14, wherein the weights are evaluated in an importance sampling procedure performed based on the statistical inference approach.

17. The system of claim 11, wherein the processor is configured to:

generate the set of approximated system variables based on expanding the non-correlated features having the dimensionality of M to the set of approximated system variables having the dimensionality of N.

18. The system of claim 11, wherein the feature space is based on a statistical transformation that converts a first set of correlated values having a first dimensionality into a second set of uncorrelated values having a second dimensionality that is lower than the first dimensionality.

19. The system of claim 18, wherein the statistical transformation comprises a manifold-learning based Isomap method.

20. The system of claim 18, wherein the numerical model of the stochastic behavior of the power system comprises a Gaussian process emulator.

* * * * *